US012078285B2

(12) United States Patent
Choi et al.

(10) Patent No.: US 12,078,285 B2
(45) Date of Patent: *Sep. 3, 2024

(54) DISPLAY APPARATUS

(71) Applicant: LG Display Co., Ltd., Seoul (KR)

(72) Inventors: ChangHee Choi, Paju-si (KR);
ChangYul Moon, Paju-si (KR); YongIk Hwang, Paju-si (KR)

(73) Assignee: LG DISPLAY CO., LTD., Seoul (KR)

( * ) Notice: Subject to any disclaimer, the term of this patent is extended or adjusted under 35 U.S.C. 154(b) by 1070 days.

This patent is subject to a terminal disclaimer.

(21) Appl. No.: 16/943,679

(22) Filed: Jul. 30, 2020

(65) Prior Publication Data

US 2021/0033240 A1 Feb. 4, 2021

(30) Foreign Application Priority Data

Jul. 31, 2019 (KR) .......................... 10-2019-0093336

(51) Int. Cl.
*F16M 11/04* (2006.01)
*G06F 1/16* (2006.01)
*G09F 9/302* (2006.01)

(52) U.S. Cl.
CPC ......... *F16M 11/046* (2013.01); *F16M 11/043* (2013.01); *G06F 1/1607* (2013.01); *G09F 9/3026* (2013.01); *F16M 11/041* (2013.01)

(58) Field of Classification Search
CPC .. F16M 11/043; F16M 11/041; G09F 9/3026; G02F 1/13336; G02F 1/133322; G06F 3/1446
See application file for complete search history.

(56) References Cited

U.S. PATENT DOCUMENTS

| | | | | |
|---|---|---|---|---|
| 10,390,451 | B2* | 8/2019 | Na | H05K 5/03 |
| 10,495,255 | B2* | 12/2019 | Brashnyk | F16M 13/02 |
| 10,626,961 | B2* | 4/2020 | Heo | G09F 9/3026 |
| 10,653,021 | B2* | 5/2020 | Kim | G09F 9/3026 |
| 10,655,656 | B2* | 5/2020 | Franklin | H01R 13/73 |
| 10,667,411 | B2* | 5/2020 | Shin | G02F 1/133308 |
| 11,140,467 | B2* | 10/2021 | Choi | H04R 1/025 |
| 11,184,986 | B2* | 11/2021 | Heo | H05K 5/0008 |
| 11,244,998 | B2* | 2/2022 | Kim | H01F 7/0252 |
| 11,259,425 | B2* | 2/2022 | Kim | H05K 5/0217 |
| 11,353,732 | B2* | 6/2022 | Yoon | G09F 9/3026 |

(Continued)

FOREIGN PATENT DOCUMENTS

| | | |
|---|---|---|
| CN | 204178650 U | 2/2015 |
| CN | 106463083 A | 2/2017 |

(Continued)

*Primary Examiner* — Bradley Duckworth
(74) *Attorney, Agent, or Firm* — Birch, Stewart, Kolasch & Birch, LLP

(57) ABSTRACT

The present disclosure relates to a display apparatus including a display panel and a tiling coupler. The display apparatus can include a display panel; a back frame configured to attach to a wall structure by a fixing element; a height adjustment element joined to the back frame, including a permanent magnet and adjusting a height; and a position adjustment element fixed to a rear surface of the display panel, including a magnetic material mounted by a magnetic force of the height adjustment element, and adjusting a position on a plane defined by the height adjustment element.

18 Claims, 17 Drawing Sheets

(56) References Cited

U.S. PATENT DOCUMENTS

| | | |
|---|---|---|
| 2018/0031919 A1 | 2/2018 | Ryu et al. |
| 2018/0374400 A1* | 12/2018 | Cai .......................... G09F 9/302 |
| 2020/0057594 A1* | 2/2020 | Nakano ................. G09F 9/3026 |
| 2020/0389987 A1* | 12/2020 | Kanno ................ G09F 13/0445 |

FOREIGN PATENT DOCUMENTS

| | | |
|---|---|---|
| CN | 109961696 A | 7/2019 |
| CN | 209149718 U | 7/2019 |
| JP | 6345380 B1 | 6/2018 |
| KR | 10-2018-0011983 A | 2/2018 |
| KR | 10-1895522 B1 | 10/2018 |
| KR | 10-2018-0128550 A | 12/2018 |
| WO | WO 2018/207273 A1 | 11/2018 |

\* cited by examiner

DISPLAY APPARATUS

CROSS-REFERENCE TO RELATED APPLICATIONS

This application claims the benefit of priority to Korean Patent Application No. 10-2019-0093336 filed on Jul. 31, 2019, the entire contents of which are hereby expressly incorporated by reference as if fully set forth herein into the present application.

BACKGROUND

Field of the Invention

The present disclosure relates to a display apparatus including a display panel and a tiling coupler (or tiling coupling structure). Especially, the present disclosure relates to a display apparatus including a tiling coupler with which a plurality of display panels are combined in a matrix manner on the same plane to be expandable without limitation in shape and size.

Discussion of the Related Art

As the information society develops, the demands for display apparatus are also developing in various manners. For example, various flat panel display apparatuses such as a liquid crystal display (LCD), and organic light emitting display (OLED), and a mirco LED (light emitting diode) display have been developed.

The flat panel display apparatuses are being developed in various sizes and usages, from small sized electronic devices such as the mobile phones to large sized electronic devices such as outdoor advertising panels. In particular, the demand for a large display apparatus is increasing. For example, it is installed in a stadium and displays information related to the game, and is used for various purposes such as a large billboard displaying and playing a main game scene.

Such a large display apparatus can be manufactured in a size comparable to that of a building's outer wall. However, it is very hard to manufacture an ultra-large flat panel display apparatus using conventional technologies. In order to address this limitation, a plurality of display panels can be arranged and assembled in a tiled manner to implement a large display apparatus, rather than manufacturing a large display apparatus with a single panel.

Such a display apparatus is called as a tiling display apparatus. Since the tiled large display apparatus can be manufactured by assembling a plurality of display panels, a seam region which is a connecting portion of the display panels, is recognized when the gaps between the display panels are larger than a certain gap. In addition, as a plurality of display panels can be disposed and combined on the same plane, it can be required that the spacing between display panels on the XY plane (for example, a plane in parallel to display surfaces of the display panels) is minimized, and there is no height difference on the Z axis (for example, an axis perpendicular to the display surfaces of the display panels). In a large display apparatus capable of freely deforming a size by combining a plurality of display panels in a matrix manner, the display panels to be combined are arranged on a plane having the same height, and they can be combined on the same plane without error in the spacing. Consequently, there is a need for new coupling structure to enable this condition easily.

SUMMARY

One purpose of the present disclosure, as for addressing the problems and limitations described above, is to provide an improved display apparatus formed by assembling a plurality of unit display devices (or unit display panels) in a tiling manner Another purpose of the present disclosure is to provide an improved display apparatus having a coupling structure capable of uniformly aligning the heights of the display panels and allowing the seams to be evenly maintained, in the assembling the display apparatus by the tiling method. Still another purpose of the present disclosure is to provide a display apparatus including a coupling structure capable of easily performing a process of assembling display apparatus in a tiling manner and selectively disassembling and reassembling a defective display panel.

In order to accomplish the above mentioned purposes of the present disclosure, a display apparatus according to the present disclosure comprises a display panel; a back frame configured to attach to a wall structure by a fixing element; a height adjustment element joined to the back frame, including a permanent magnet and adjusting a height; and a position adjustment element fixed to a rear surface of the display panel, including a magnetic material mounted by a magnetic force of the height adjustment element, and adjusting a position on a plane defined by the height adjustment element.

In one example, the height adjustment element includes a screw portion joined to the back frame and configured to adjust the height, and a mount disposed on the screw portion and facing the position adjustment element.

In one example, the screw portion is joined into a screw hole of the back frame, and the height is adjusted by a rotating direction.

In one example, the position adjustment element includes an attaching surface fixed to the display panel, and a position adjusting surface protruded from the attaching surface toward the height adjustment element, wherein the position adjusting surface is settled on a mount surface defined at an upper surface of the mount by the magnetic force of the height adjustment element, and configured to change the position of the position adjusting surface on a plane of the mount surface by an external force.

In one example, the height adjustment element further includes a base hole facing the position adjustment element, and the position adjustment element further includes a position limiter inserted into the base hole of the height adjustment element, and configured to restrict a position range of display panel.

In one example, an inner diameter of the base hole is larger than an outer diameter of the position limiter, and the position limiter is controlled within a range of difference between the inner diameter and the outer diameter on the plane defined by the height adjustment element by the external force, after inserting into the base hole.

In one example, the position adjustment element further includes an attaching surface fixed to the display panel; a position adjusting surface protruded from the attaching surface toward the height adjustment element; a position limiting hole formed at the position adjusting surface; an adjusting chamber formed between the attaching surface and the position adjusting surface; and a position limiter having a head mounted in the adjusting chamber, an extrusion protruded from a center portion of a bottom surface of the head, and a cushion attached on an upper surface of the head, wherein the position limiting hole has a diameter smaller than that of the head and larger than that of the extrusion, and the extrusion is configured to penetrate the position limiting hole and to be inserted into the base hole.

In one example, the position adjusting hole includes an oval shape having a major axis and a minor axis, the minor axis has a minor length that is same as a diameter of the extrusion, and the major axis has a major length larger than the diameter of the extrusion, and is disposed in a diagonal direction on a surface of the display panel.

In one example, a plurality of the height adjustment element are disposed at the back frame, a plurality of the position adjustment elements are provided on the display panel, and each one of the position adjustment elements is disposed at the display panel as corresponding to each one of the height adjustment elements.

In one example, the display apparatus further comprises a levelizer disposed at the back frame as being apart from the height adjustment element.

In one example, one of the height adjustment elements is disposed at each corner of the back frame, and each one of the levelizer is disposed at a middle portion of each side of the back frame.

In one example, the position adjustment element includes an attaching surface fixed at circumference of the rear surface of the display panel; a position adjusting surface and an installing surface protruded from the attaching surface toward the back frame, and the position adjusting surface is protruded as corresponding to the height adjustment element, and the installing surface has a vessel shape configured to ensure a space for mounting a device.

In one example, the display apparatus further comprises a middle frame disposed between the height adjustment element and the position adjustment element, and attached at the rear surface of the display panel, and the middle frame has a vessel shape configured to be protruded toward the back frame to ensure a space for mounting a device.

In one example, the height adjustment element has a cylindrical body having a neodymium magnetic material.

In one example, the height adjustment element is divided into 4 fan-shaped columns which are magnetized with N pole and S pole alternately.

In addition, a display apparatus according to the present disclosure comprises a display panel; a back frame configured to attach on a wall structure by a fixing element; a height adjustment element joined to the back frame, including a permanent magnet and adjusting a height; a position adjustment element including an attaching surface fixed to a rear surface of the display panel, a position adjusting surface protruding from the attaching surface toward the height adjustment element, a position limiting hole formed at the position adjusting surface, and an adjusting chamber formed between the attaching surface and the position adjusting surface; and a position limiter including a head settled inside of the adjusting chamber, an extrusion protruded from a middle portion of a bottom surface of the head, and a cushion attached on an upper surface of the head, wherein the position limiting hole has a diameter smaller than that of the head and larger than that of the extrusion, and the extrusion is configured to pass through the position adjusting hole and to be inserted into the position limiting hole.

In one example, the position adjustment element includes a magnetic material for being settled by a magnetic force of the height adjustment element, and for controlling the position of the position adjusting surface on a plane defined by the height adjustment element.

The display apparatus according to the present disclosure has a structure in which a plurality of display panels can be assembled by a tiling method using a back frame. In detail, a height adjustment element made of a permanent magnet is installed on the back frame, and a position adjustment element made of a magnetic material is installed on the display panel. The position adjustment element is attached by the magnetic force of the height adjustment element, and an external force can be used to adjust the positions of the display panels on a plane (for example, a plane in parallel to display surfaces of the display panels). Further, the height of the display panel can be adjusted by using the height adjustment element. Accordingly, the position on the XY plane and the height on the Z axis can be adjusted respectively, so that it is possible to provide a large-sized display apparatus that is combined without gaps of seams on the same plane. In addition, the coupling force tiling a plurality of display panels uses the magnetic force, so it has an advantage of easy assembly and disassembly. According to the present disclosure, after assembling a large-sized display apparatus by a tiling method, even though a problem occurs in any one display panel, it is possible to selectively disassemble it and to reassemble with a new normal display panel very easily.

In addition to the effects of the present disclosure mentioned above, other features and advantages of the present disclosure can be described below, or can be clearly understood by those skilled persons in this art from such below descriptions and explanations.

BRIEF DESCRIPTION OF THE DRAWINGS

The accompanying drawings, which are included to provide a further understanding of the disclosure and are incorporated in and constitute a part of this application, illustrate embodiments of the disclosure and together with the description serve to explain the principle of the disclosure. In the drawings.

DETAILED DESCRIPTION OF THE DISCLOSURE

Figure 1:
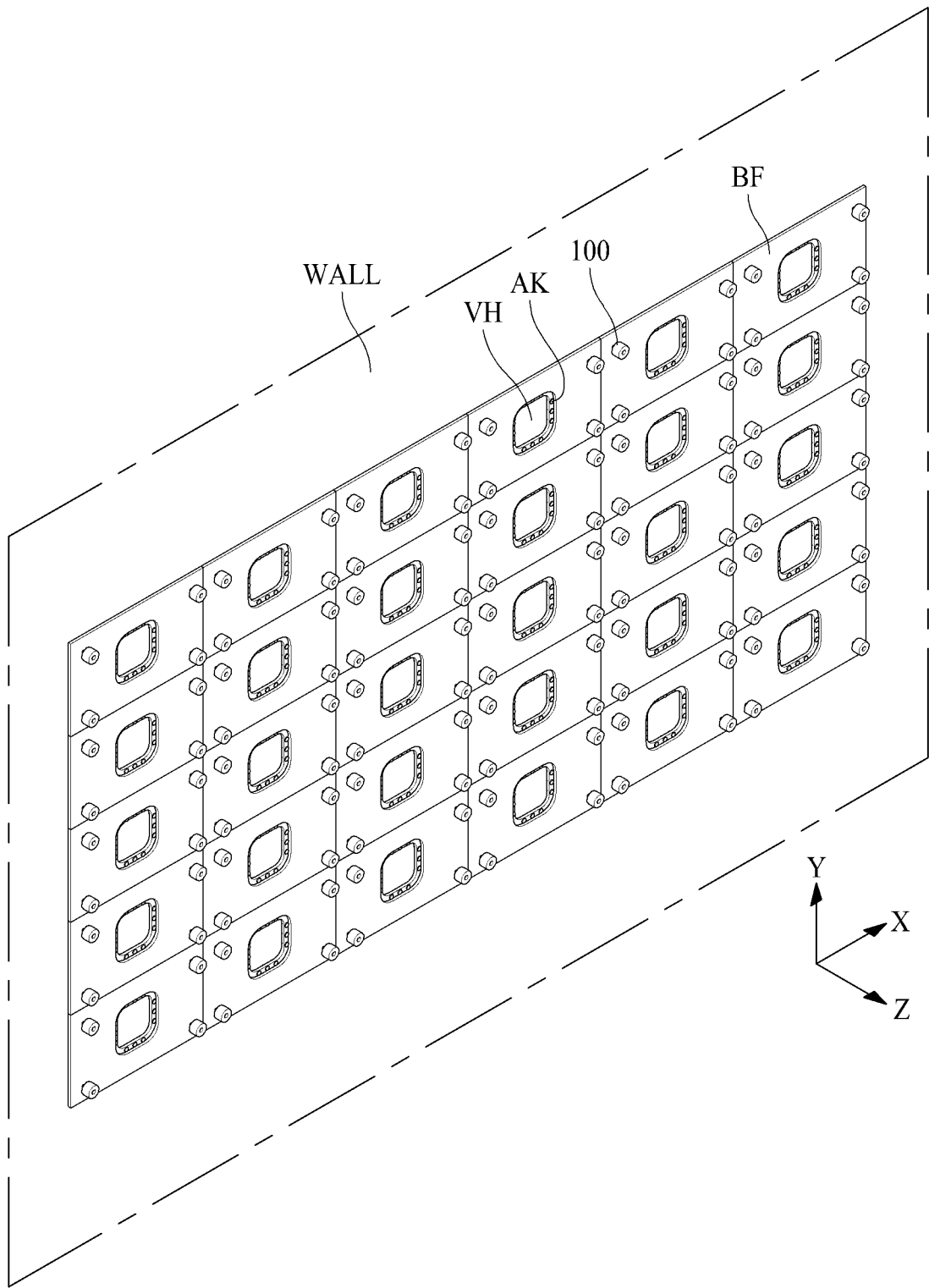
FIG. 1 is a perspective view for illustrating the overall appearance of a back frame in a tiled display apparatus according to one or more embodiments of the present disclosure.

Reference will now be made in detail to the exemplary embodiments of the present disclosure, examples of which are illustrated in the accompanying drawings. Wherever possible, the same reference numbers will be used throughout the drawings to refer to the same or like parts. In the specification, it should be noted that like reference numerals already used to denote like elements in other drawings are used for like elements wherever possible. In the following description, when a function and a configuration known to those skilled in the art are irrelevant to the essential configuration of the present disclosure, their detailed descriptions will be omitted. The terms described in the specification should be understood as follows. Advantages and features of the present disclosure, and implementation methods thereof will be clarified through following embodiments described with reference to the accompanying drawings. The present disclosure can, however, be embodied in different forms and should not be construed as limited to the embodiments set forth herein. Rather, these embodiments are provided so that this disclosure will be thorough and complete, and will fully convey the scope of the present disclosure to those skilled in the art. Further, the present disclosure is only defined by scopes of claims.

A shape, a size, a ratio, an angle, and a number disclosed in the drawings for describing embodiments of the present disclosure are merely an example, and thus, the present disclosure is not limited to the illustrated details. Like reference numerals refer to like elements throughout. In the following description, when the detailed description of the relevant known function or configuration is determined to unnecessarily obscure the important point of the present disclosure, the detailed description will be omitted.

In the case that "comprise," "have," and "include" described in the present specification are used, another part can also be present unless "only" is used. The terms in a singular form can include plural forms unless noted to the contrary.

In construing an element, the element is construed as including an error range although there is no explicit description.

In describing a positional relationship, for example, when the positional order is described as "on," "above," "below," and "next," the case of no contact there-between can be included, unless "just" or "direct" is used. If it is mentioned that a first element is positioned "on" a second element, it does not mean that the first element is essentially positioned above the second element in the figure. The upper part and the lower part of an object concerned can be changed depending on the orientation of the object. Consequently, the case in which a first element is positioned "on" a second element includes the case in which the first element is positioned "below" the second element as well as the case in which the first element is positioned "above" the second element in the figure or in an actual configuration.

In describing a temporal relationship, for example, when the temporal order is described as "after," "subsequent," "next," and "before," a case which is not continuous can be included, unless "just" or "direct" is used.

It will be understood that, although the terms "first," "second," etc. can be used herein to describe various elements, these elements should not be limited by these terms and may not define any order. These terms are only used to distinguish one element from another. For example, a first element could be termed a second element, and, similarly, a second element could be termed a first element, without departing from the scope of the present disclosure.

Further, "X axis direction", "Y axis direction" and "Z axis direction" may not be interpreted only as a geometric relationship in which the relationship between each other is perpendicular, and can mean that the configuration of the present disclosure has a wider scope to the extent that it can functionally work.

In describing the elements of the present disclosure, terms such as the first, the second, A, B, (a) and (b) can be used. These terms are only to distinguish the elements from other elements, and the terms are not limited in nature, order, sequence or number of the elements. When an element is described as being "linked", "coupled" or "connected" to another element that element can be directly linked, coupled to or connected to that other element, but also indirectly unless otherwise specified. It is to be understood that other elements can be "interposed" between elements that can be connected to or coupled to each other.

It should be understood that the term "at least one" includes all combinations related with any one item. For example, "at least one among a first element, a second element and a third element" can include all combinations of two or more elements selected from the first, second and third elements as well as each element of the first, second and third elements.

Features of various embodiments of the present disclosure can be partially or overall coupled to or combined with each other, and can be variously inter-operated with each other and driven technically as those skilled in the art can sufficiently understand. The embodiments of the present disclosure can be carried out independently from each other, or can be carried out together in a co-dependent relationship.

The 'display apparatus' in this application can comprise a liquid crystal module (LCM), an organic light emitting display module (OLED Module), or a quantum dot module (QD Module) which have a display panel and a driver for driving the display panel. The 'display apparatus' can further comprise a complete product or final product including LCM, OLED Module or QD Module such as a note-book computer, a television set, a computer monitor, an equipment apparatus having an automotive apparatus or other modules for vehicle, a set electronic apparatus or a set device (or set apparatus) such as a smart phone or a mobile electronic apparatus.

Therefore, the 'display apparatus' can be any one of a display device such as LCM, OLED Module and QD Module, an application device including LCM, OLED Module or QD Module, or a set apparatus for end user's final devices.

In another example, the LCM, OLED Module or QD Module can be referred to the 'display apparatus', and the final electronic devices including LCM, OLED Module or QD Module can be referred to the 'set apparatus'. For example, the display apparatus can include a display panel of liquid crystal display or organic electroluminescence display, and a source printed circuit board (PCB) for driving the display panel. The set apparatus can include the display apparatus and a set PCB or control PCB for driving the set apparatus itself by connecting to the display apparatus and the source PCB.

The display panel according to the embodiments of the present disclosure can include a liquid crystal display panel, an organic light emitting diode display panel, and an electroluminescent display panel, but it is not limited thereto. For example, display panel can have any structure in which the display panel can be vibrated to generate sound. In addition, the display panel applied to the display apparatus according to the embodiment of the present disclosure is not limited in the shape or size of the display panel.

In the case that the display panel is the liquid crystal display panel, the display panel can include a plurality of gate lines, a plurality of data lines, and a plurality of pixels (or sub pixels) defined by the gate lines and the data lines. The display panel can include an array substrate including thin film transistor as a switching element for controlling the light transmittance of each pixel, an upper substrate including a color filter and/or a black matrix, and a liquid crystal layer disposed between the array substrate and the upper substrate.

In the case that the display panel is an organic light emitting diode display panel, the display panel can include a plurality of gate lines, a plurality of data lines, and a plurality of pixels (or sub pixels) defined by the gate lines and the data lines. The display panel can include an array substrate including thin film transistor for applying the electric voltage to each pixel selectively, an organic light emitting layer on the array substrate, and an encapsulation substrate disposed on the array substrate for covering the organic light emitting layer. The encapsulation substrate can protect the thin film transistor and the organic light emitting layer from any external shocks, and prevent moisture and oxygen from penetrating into the organic light emitting layer. In addition, the organic light emitting layer formed on the array substrate can be replaced by the inorganic light emitting layer, the quantum dot light emitting layer, or the micro light emitting diode element.

Hereinafter, an example of a display apparatus according to the present disclosure will be described in detail with reference to the accompanying drawings. In designating reference numerals to elements of each drawing, the same components can have the same reference numerals as much as possible even though they are shown in different drawings. Scale of the elements shown in the accompanying drawings can have a different scale from the actual for convenience of description, it is not limited to the scale shown in the drawings.

Figure 2:
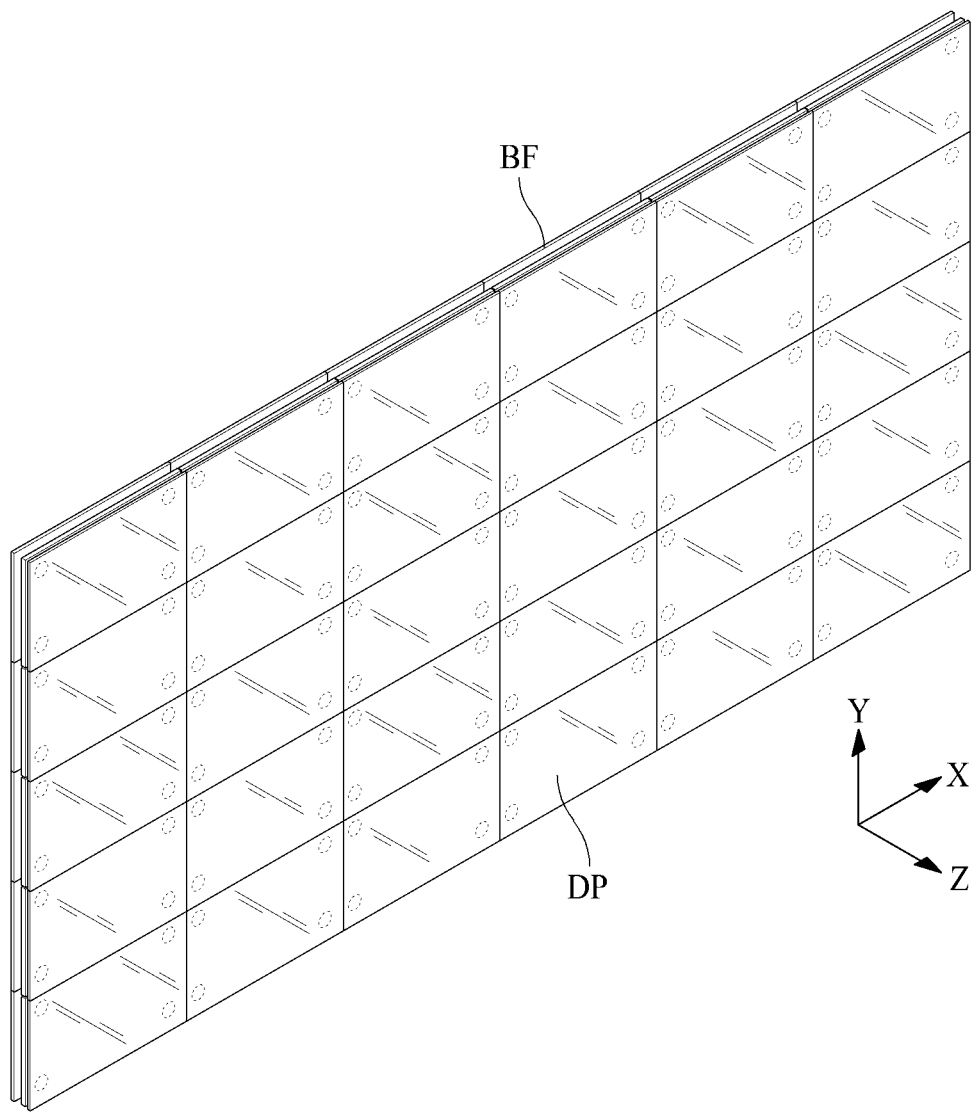
FIG. 2 is a perspective view for illustrating the overall appearance of a display apparatus assembled by a tiling method according to one or more embodiments of the present disclosure.

Referring to FIGS. 1 and 2, a display apparatus assembled by the tiling method according to the present disclosure will be explained. FIG. 1 is a perspective view for illustrating the overall appearance of a back frame in a tiled display apparatus according to the present disclosure. FIG. 2 is a perspective view for illustrating the overall appearance of a display apparatus assembled by a tiling method according to the present disclosure. All the components of the display apparatus and the back frame structures according to all embodiments of the present disclosure are operatively coupled and configured.

Here, an example will be explained in which a large display apparatus can be installed on an exterior wall of a building, a large interior wall of the lobby, or a large wall specially provided for information. However, it is not limited to this, and it can be applied to a movable frame not a fixed wall, e.g., any surface on which one or more display panels can be affixed. The coordinate systems shown in FIGS. 1 and 2 are added for convenience of explanation. For example, display apparatus can be arranged on a wall of XY plane, and video information can be provided from the display apparatus in the Z direction. The viewer can view the video image provided by the display apparatus by looking at the XY plane in the Z direction.

As shown in FIG. 1, a plurality of back frames BF can be disposed in a matrix manner on a wall structure WALL (or any applicable surface). FIG. 1 illustrates a structure in which 30 back frames are tiled with six back frames in a row in the lateral direction and five back frames in a column in the longitudinal direction. It is not limited thereto, and it is possible to form a back frame assembly of a desired size with more or less numbers of the back frame BF. For instance, the shape and/or size of the plurality of back frame BF as a whole can vary, e.g., the back frame can be in other suitable shape, e.g., trapezoid, oval, rhombus, triangle, circle, etc.

The back frame BF can be a structure that is a basic frame for arranging a plurality of display panels in a tiling method. For example, one back frame BF can have a size and shape to accommodate one display panel. The back frame BF can be provided with a height adjustment element 100 capable of coupling the display panel. The back frame BF can further include a vent hole VH for dissipating the heat generated from the display panel.

The back frame BF can be fixed and arrayed on the wall structure WALL by a plurality of fixing member AK. The fixing member AK can be a fastening member for firmly fixing the frame on to the wall structure, such as an anchor, a screw or a concreate nail. FIG. 1 can illustrate a structure in which the fixing member AK can be fixed to the wall structure WALL via a fixing hole provided around the vent hole VH formed in the central portion of the back frame BF. However, it is not limited thereto, but it can be changed in various ways depending on the overall design structure.

One back frame BF can include a height adjustment element 100. It is preferable that a plurality of the height adjustment elements 100 can be disposed at one back frame BF. FIG. 1 illustrates 4 height adjustment elements 100 are disposed each at each corner portions of each back frame BF, but it is not limited thereto. In one example, one or two height adjustment elements 100 can be further disposed at a central portion of the back frame BF. In another example, 4 more height adjustment elements 100 can be disposed at each middle portion of the 4 sides.

Referring to FIG. 2, one display panel DP can be disposed on each back frame BF fixed and arrayed on the wall structure WALL in a matrix manner. The display panel DP can be mounted on the height adjustment element 100 of the back frame BF, and the disposed height of the display panel DP can be controlled by the height adjustment element 100. Accordingly, the plurality of display panels DP can be implemented a completely flat state by positioning the upper surface on the XY plane at the same height. Here, the height of the display panel DP can be adjusted on the Z axis.

Hereinafter, various tiling coupler for coupling and fixing the display panels DP to the back frame BF will be explained in detail with reference to the drawings.

First Embodiment

Figure 3:
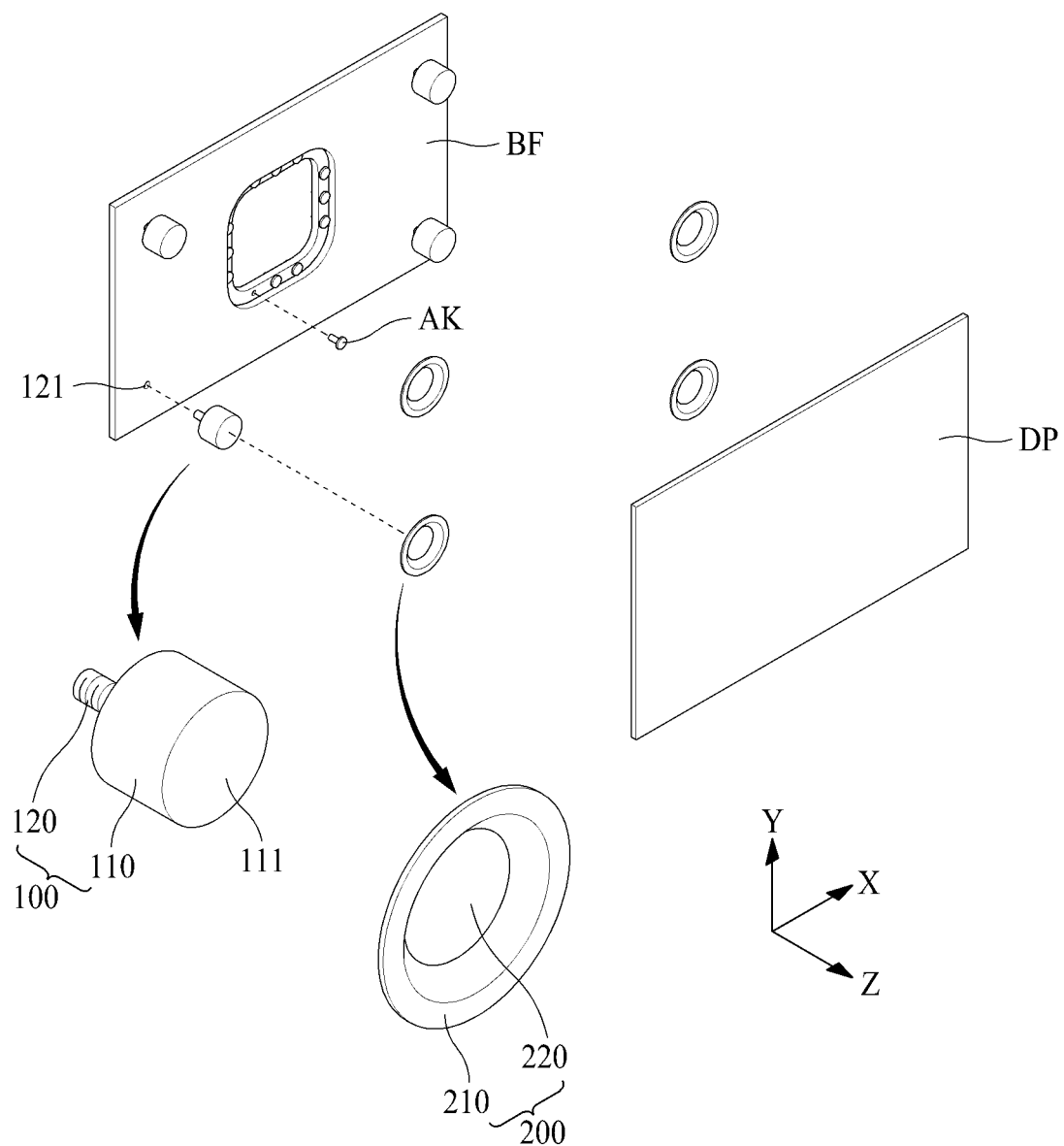
FIG. 3 is a perspective view for illustrating a display apparatus including a tiling coupler according to a first embodiment of the present disclosure.

Referring to FIG. 3, a first embodiment of the present disclosure will be explained. FIG. 3 is a perspective view for illustrating a display apparatus including a tiling coupler according to the first embodiment of the present disclosure.

The display apparatus according to the first embodiment of the present disclosure can comprise a back frame BF, a display panel DP, a height adjustment element 100 and a position adjustment element 200. The back frame BF can be attached and/or fixed onto the wall structure WALL using a fixing member AK. The display panel DP can be arranged as corresponding to the back frame BF. The display panel DP can include a liquid crystal display panel, an electroluminescent display panel, a quantum dot display panel and/or other flat display panel. Although in this example, the shape of the black frame BF is a rectangle/square, other shapes are possible for each black frame BF in all embodiments described herein. Further, although 4 height adjustment elements 100 are shown at four corners of the black frame BF, other numbers of height adjustment elements 100 provided at different location(s) of the black frame BF are possible in all embodiments described herein.

The height adjustment element 100 can be a structure mounted into the back frame BF and capable of adjusting its height. In particular, the height adjustment element 100 can be made of a permanent magnet material. For example, it is preferable that the height adjustment element 100 can be made of a neodymium magnet. Neodymium magnets can be made of neodymium, iron and boron, and can be processed into various shapes. There can be a property having a large magnetic force even in a small volume, it can be applied to various fields.

The height adjustment element 100 can include a cylindrical mount 110 and a screw portion 120. The mount 110 and the screw portion 120 can be formed of a united body, or formed as separated objects and then combined. For example, the screw portion 120 can have a smaller diameter than the mount 110 and can have a structure protruding from the center of the lower surface of the mount 110. In another example, after forming the screw portion 120 and the mount 110 in a long cylindrical shape with a neodymium magnet, a thread is formed in a lower portion to define the screw portion 120, and the upper portion can be defined as the mount 110.

The screw portion 120 can be inserted into and coupled to a screw hole 121 provided at the back frame BF. The height of the mount 110 can be controlled by rotating the screw portion 120. The mount 110 can be disposed on the screw portion 120 and facing with the position adjustment element 200. In particular, the mount 110 can include a flat mount surface 111 having a predetermined area.

In one example, the screw portion 120 can be a right-handed screw. In this case, as rotating to right-hand direction, the screw portion 120 can be gradually inserted into the screw hole 121. As rotating to left-hand direction, the screw portion 120 can be gradually come out of the screw hole 121. For example, as rotating to right-hand direction, the mount 110 can move to −Z direction, while as rotating to left-hand direction, the mount 110 can move to +Z direction. Accordingly, due to the rotation of the screw portion 120, the height on the Z axis of the mount surface 111 of the mount 110 can be controlled.

The position adjustment element 200 can be attached or fixed to a rear surface of the display panel DP. It is preferable that each one of the position adjustment elements 200 can be fixed on the rear surface of the display panel DP as corresponding to each one of the height adjustment elements 100. Moreover, it is preferable that the position adjustment element 200 can be formed of a magnetic material that can be attached by the magnetic force of the permanent magnet. When a magnetic material is placed in a magnetic field, it is magnetized and generates a magnetic force. In the interim, it is preferable that the position adjustment element 200 can be formed of a soft magnetic material of which magnetic force is disappeared when the magnetic field is lost.

For example, as the height adjustment element 100 can be a permanent magnet, the height adjustment element 100 can be made of a hard magnetic material such as Al—Ni—Co (Aluminum-Nickel-Cobalt) alloy. The position adjustment element 200 can be made of soft magnetic material which is magnetized and seated on the height adjustment element 100 when it is within the magnetic force range of the height adjustment element 100. When the position adjustment element 200 is out of the magnetic force range of the height adjustment element 100, the magnetization is removed.

The position adjustment element 200 can include an attaching surface 210 and a position adjusting surface 220. The attaching surface 210 can be a portion for attaching or fixing on the rear surface of the display panel DP. The position adjusting surface 220 can be a protruded portion from the attaching surface 210 toward the height adjustment element 100. For example, the position adjustment element 200 can have a circle shape, as shown in FIG. 3. The attaching surface 210 can have a circular ring shape at the outermost circumference of the position adjustment element 200. The position adjusting surface 220 can have a disc shape surrounded by the attaching surface 210. The position adjusting surface 220 can be a suppressed portion from the attaching surface 210.

The position adjusting surface 220 can be a surface settled on the mount surface 111 by the magnetic force of the mount 110. The position adjusting surface 220 can be settled or mounted on the mount surface 111, and can be freely moved within the area of the mount surface 111 on the XY plane formed by the mount surface 111. As the position adjusting surface 220 moves on the mount surface 111, the position on the XY plane of the display panel DP fixed to the position adjustment element 200 can be controlled or adjusted.

In the display apparatus according to the first embodiment of the present disclosure, a plurality of back frames BF are disposed and a display panel DP is attached to each of the back frames BF, thereby a display apparatus having any surface area size larger than the display panel DP can be implemented by combining the display panels DP in a tiling manner. In addition, as the height of each display panel DP can be finely controlled using the height adjustment element 100 provided in the back frame BF, all tiled display panels DP can be combined as having the same surface height on the Z axis. Furthermore, by controlling the position on the XY plane of the position adjustment element 200 fixed to the display panel DP on the height adjustment element 100 fixed to the back frame BF, the tiled display panels DP can be in close contact with each other having no gap therebetween.

When combining a plurality of display panels DP in tiling method, the position on the XY plane and the height on the Z axis can be respectively controlled or adjusted. Therefore, it is possible to provide a large-sized display apparatus that is combined without gaps of seams on the same plane.

Since the coupling force for tiling the plurality of display panels DP uses the magnetic force, there can be an advantage of easy assembly and disassembly. After assembling a large-sized display apparatus by a tiling method, when a problem occurs in any display panel DP, it is possible to selectively separate it and reassemble a new normal display panel DP.

Second Embodiment

Figure 4:
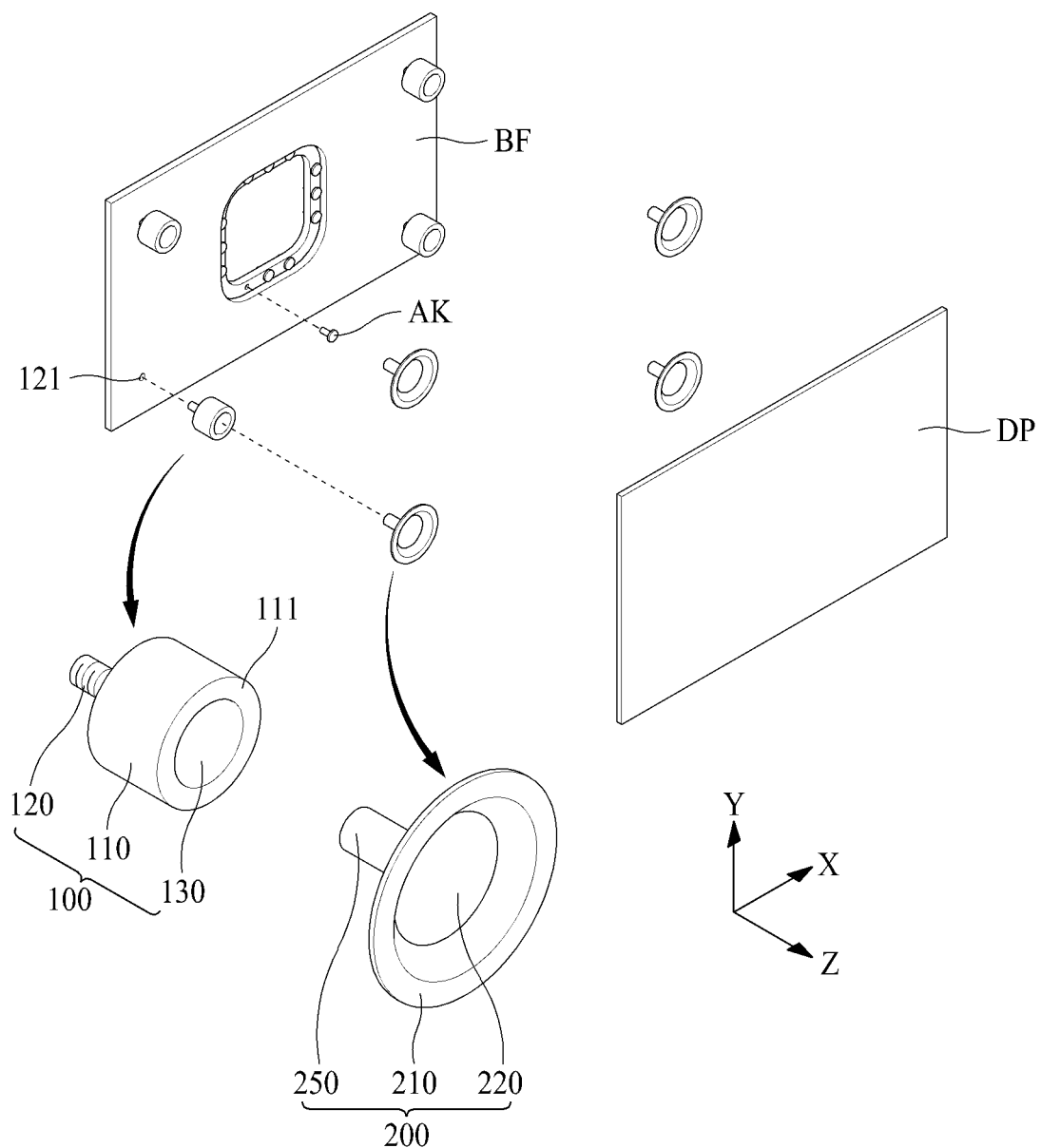
FIG. 4 is a perspective view for illustrating a display apparatus including a tiling coupler according to a second embodiment of the present disclosure.

Hereinafter, referring to FIG. 4, the second embodiment of the present disclosure will be explained. FIG. 4 is a perspective view for illustrating a display apparatus including a tiling coupler according to the second embodiment of the present disclosure.

The display apparatus according to the second embodiment of the present disclosure can comprise a back frame BF, a display panel DP, a height adjustment element 100 and a position adjustment element 200. The overall structure of the display apparatus having a tiling coupler according to the second embodiment can have very similar structure of the first embodiment. The difference is on the detailed structure of the tiling coupler including the height adjustment element 100 and the position adjustment element 200. Hereinafter, the differences appeared in the second embodiment will be mainly described. Here, the same drawings and reference numerals as in FIG. 3 that are not described refer to the first embodiment.

The height adjustment element 100 according to the second embodiment can be a structure coupled or joined to the back frame BF and adjusted or controlled in height. It is preferable that the height adjustment element 100 can be made of a permanent magnet. The height adjustment element 100 can include a cylindrical mount 110, a screw portion 120 and a base hole 130.

The screw portion 120 can be joined or coupled into the screw hole 121 provided at the back frame BF. The height of mount 110 can be controlled by the rotation of the screw portion 120. The mount 110 can be disposed on the screw portion 120 and facing the position adjustment element 200. The mount 110 can include a flat mount surface 111 having a predetermined surface area. The mount surface 111 can have a disc ring disposed at the outermost circumference of the mount 110. Therefore, a middle portion of the mount surface 111 can be recessed or depressed into the mount 110 to form the base hole 130. The depth of the base hole 130 can penetrate the mount 110. In this case, the mount 110 can have a hollowed cylindrical shape.

The position adjustment element 200 can be attached or fixed on the rear surface of the display panel DP. It is preferable that each one of the position adjustment element 200 can be disposed on the rear surface of the display panel DP as corresponding to each one of the height adjustment element 100. The position adjustment element 200 can include an attaching surface 210, a position adjusting surface 220 and a protruded portion (or extrusion) 250.

The attaching surface 210 can be a portion for attaching or fixing on the rear surface of the display panel DP. The position adjusting surface 220 can be a protruded portion from the attaching surface 210 toward the height adjustment element 100. The protruded portion 250 can be a part protruding from the middle of the position adjusting surface 220 towards the base hole 130 of the mount 110.

For example, as shown in FIG. 4, the position adjustment element 200 can have a circular shape. The attaching surface 210 can have a circular ring shape at the outermost circumference of the position adjustment element 200. The position adjusting surface 220 can have a disc shape surrounded by the attaching surface 210. The position adjusting surface 220 can be a suppressed portion from the attaching surface 210. The protruded portion 250 can be inserted into the base hole 130. The protruded portion 250 can have a cylinder shape. It is preferable that the diameter of the protruded portion 250 can be smaller than that of the base hole 130. The protruded portion 250 can be movable so that the position adjustment element 200 can be controlled on the mount surface 111 within a certain range not to be beyond the range. Accordingly, it is preferable that the diameter of the protruded portion 250 can be much smaller than the diameter of the base hole 130.

After mounting the height adjustment element 100 to the back frame BF, and fixing the position adjustment element 200 to the back surface of the display panel DP, the protruded portion 250 of the position adjustment element 200 is inserted into the base hole 130 of the height adjustment element 100, then the position adjustment element 200 can be mounted on the height adjustment element 100 by the magnetic force of the height adjustment element 100. Accordingly, the display panels DP can be installed at the back frame BF. In this way, a large-scaled display apparatus can be implemented by assembling the plurality of display panels DP to the back frame BF arranged in a matrix manner and fixed on the wall structure WALL.

The position adjusting surface 220 of the position adjustment element 200 can be coupled with the mount surface 111 of the height adjustment element 100. Here, the protruded portion 250 can be movable within the range limited by the inner diameter of the base hole 130. When adjusting the position of the display panel DP on the XY plane, the movement range of the protruded portion 250 can be restricted by the base hole 130, so that the position can be adjusted without the position adjustment element 200 being outside the range of the mount surface 111 of the height adjustment element 100.

In the first embodiment, as the position adjustment element 200 is moved on the mount surface 111 of the height adjustment element 100, when the position adjustment element 200 is biased too much to one side, then the display panel DP can be disengaged from the back frame BF. However, in the second embodiment, the position of the display panel DP on the XY plane can be controlled within a stable range without disengaged from the back frame BF.

Third Embodiment

Figure 5:
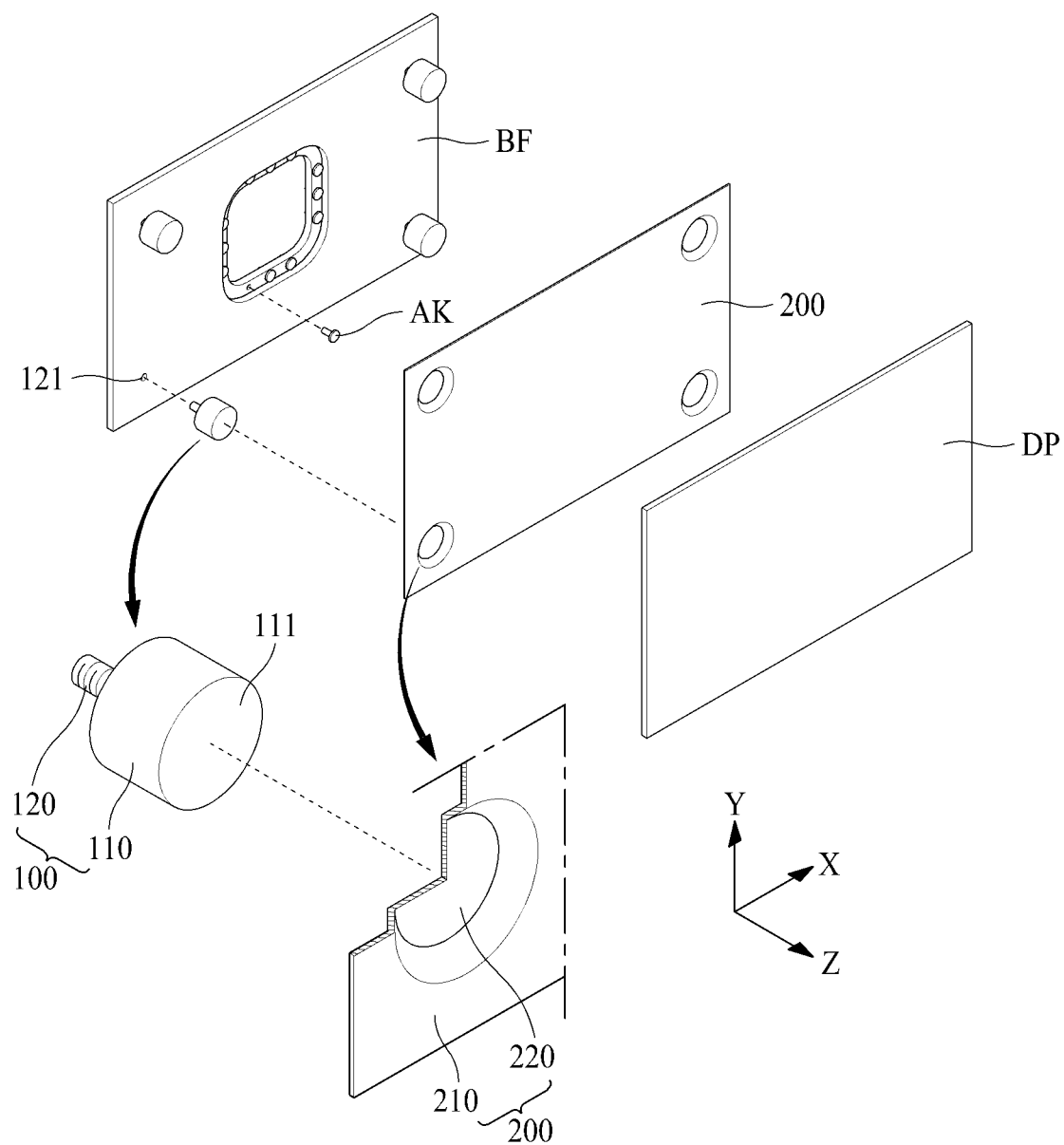
FIG. 5 is a perspective view for illustrating a display apparatus including a tiling coupler according to a third embodiment of the present disclosure.

Hereinafter, referring to FIG. 5, the third embodiment of the present disclosure will be explained. FIG. 5 is a perspective view for illustrating a display apparatus including a tiling coupler according to the third embodiment of the present disclosure.

The display apparatus according to the third embodiment of the present disclosure can comprise a back frame BF, a display panel DP, a height adjustment element 100 and a position adjustment element 200. The overall structure of the display apparatus having a tiling coupler according to the third embodiment can have very similar structure of the first embodiment. The difference is on the detailed shape of the position adjustment element 200. Hereinafter, the differences appeared in the third embodiment will be mainly described. Here, the same drawings and reference numerals as in FIG. 3 that are not described refer to the first embodiment.

In the display apparatus according to the third embodiment, the position adjustment element 200 can have an area and shape corresponding to the area and shape of the display panel DP. For example, the position adjustment element 200 can have a rectangular shape same as the display panel DP, and can be joined to the rear surface of the display panel DP. The position adjustment element 200 can be attached to the rear surface of the display panel DP by an adhesive material. Otherwise, the position adjustment element 200 can have a frame structure surrounding and fixing the sides of the display panel DP. Since the display panels DP are assembled in a tiling manner to form a large-scaled display apparatus, the description will be focused on a structure of coupling to the back surface of the display panel DP for preventing the joints between the tiled display panels DP from becoming prominent.

The position adjustment element 200 can include an attaching surface 210 and a position adjusting surface 220. The attaching surface 210 can be the portion for attaching to the rear surface of the display panel DP. Therefore, the attaching surface 210 can be attached to whole rear surface of the display panel DP. The position adjusting surface 220 can be the portion extruded to the height adjustment element 100 from the attaching surface 210. For example, the position adjustment element 200 can have a rectangular plate shape as shown in FIG. 5. The position adjusting surface 220 can be a recessed portion from the attaching surface 210 as corresponding to the mount surface 111 of the height adjustment element 100. The position adjusting surface 220 can have a disc shape recessed from the attaching surface 210.

The position adjusting surface 220 can be a surface settled on the mount surface 111 by the magnetic force of the mount 110. As the position adjusting surface 220 is settled on the mount surface 111, it can be freely moveable within the surface area of the mount surface 111 on the XY plane formed by the mount surface 111. Therefore, as the position adjusting surface 220 moves over the mount surface 111, the position on the XY plane of the display panel DP fixed to the position adjustment element 200 can be controlled or adjusted.

The attaching surface 210 of the position adjustment element 200 according to the third embodiment can be engaged with the most rear surface of the display panel DP. The position adjusting surface 220 of the position adjustment element 200 can be contacted to the mount 110, the permanent magnet. When the neodymium is used for the permanent magnet, the magnetic force can be degraded by the heat generated from the display panel DP. Therefore, it is preferable to have a structure for preventing the heat from being concentrated to the mount 110 which is a permanent magnet.

In the third embodiment, the heat generated from the display panel DP can be effectively dissipated or discharged by forming the attaching surface 210 of the position adjustment element 200 covering the entire rear surface of the display panel DP with a metal material such as a soft magnetic material. In addition, the position adjustment element 200 contacting the permanent magnet mount 110 has a structure that partially protrudes from the attaching surface 210, thereby it has a structure that can minimize the transfer of heat to the position adjusting surface 220. The position adjustment element 200 according to the third embodiment can efficiently dissipate the heat of the display panel DP, and can protect the magnetic force of the height adjustment element 100, the permanent magnet, from the heat.

The shape of the position adjustment element 200 according to the third embodiment can be applied to the position adjustment element 200 according to the second embodiment. In addition, it can also be applied to the position adjustment element 200 of the other embodiments described later.

Fourth Embodiment

Figure 6:
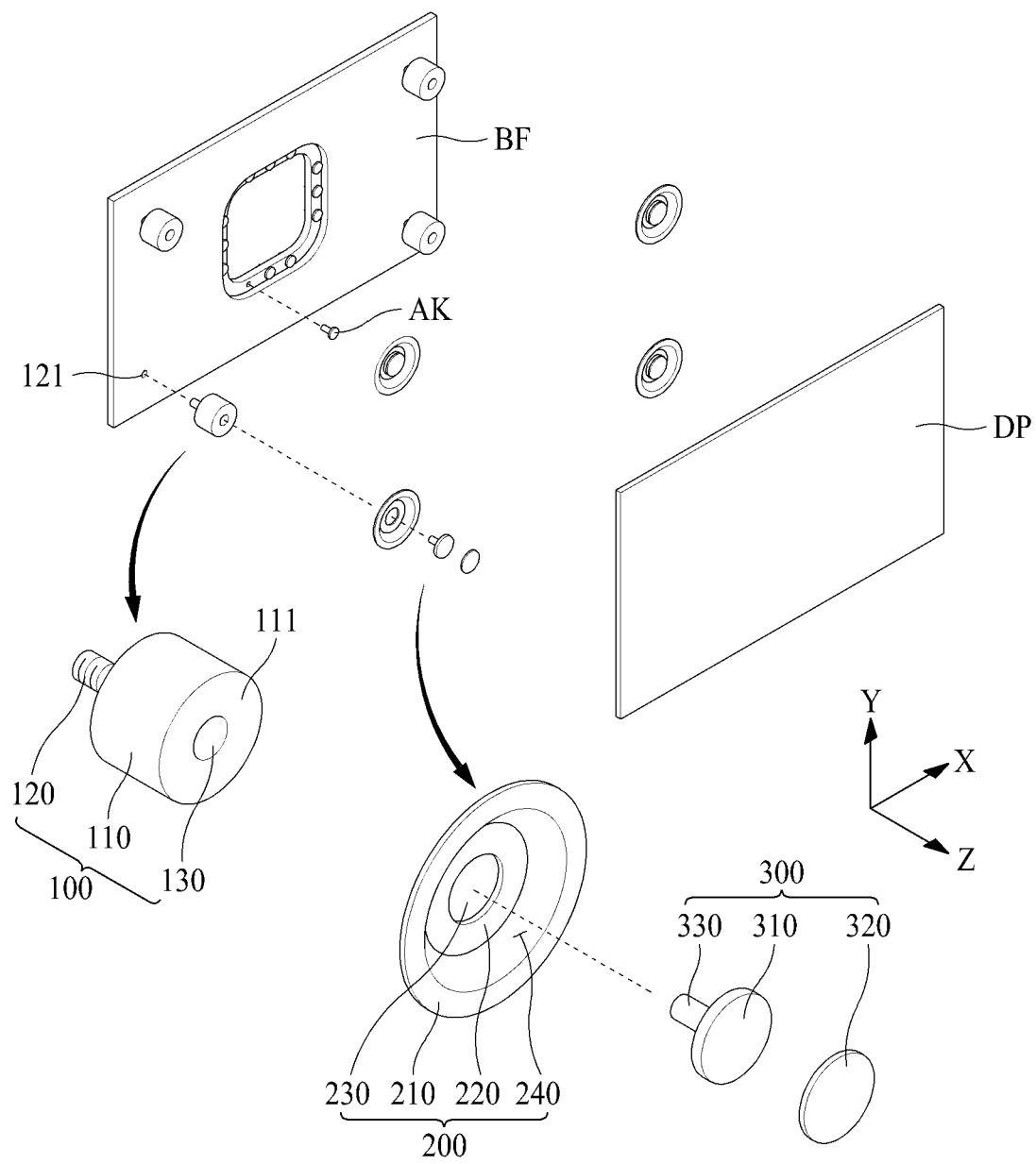
FIG. 6 is a perspective view for illustrating a display apparatus including a tiling coupler according to a fourth embodiment of the present disclosure.
Figure 7:
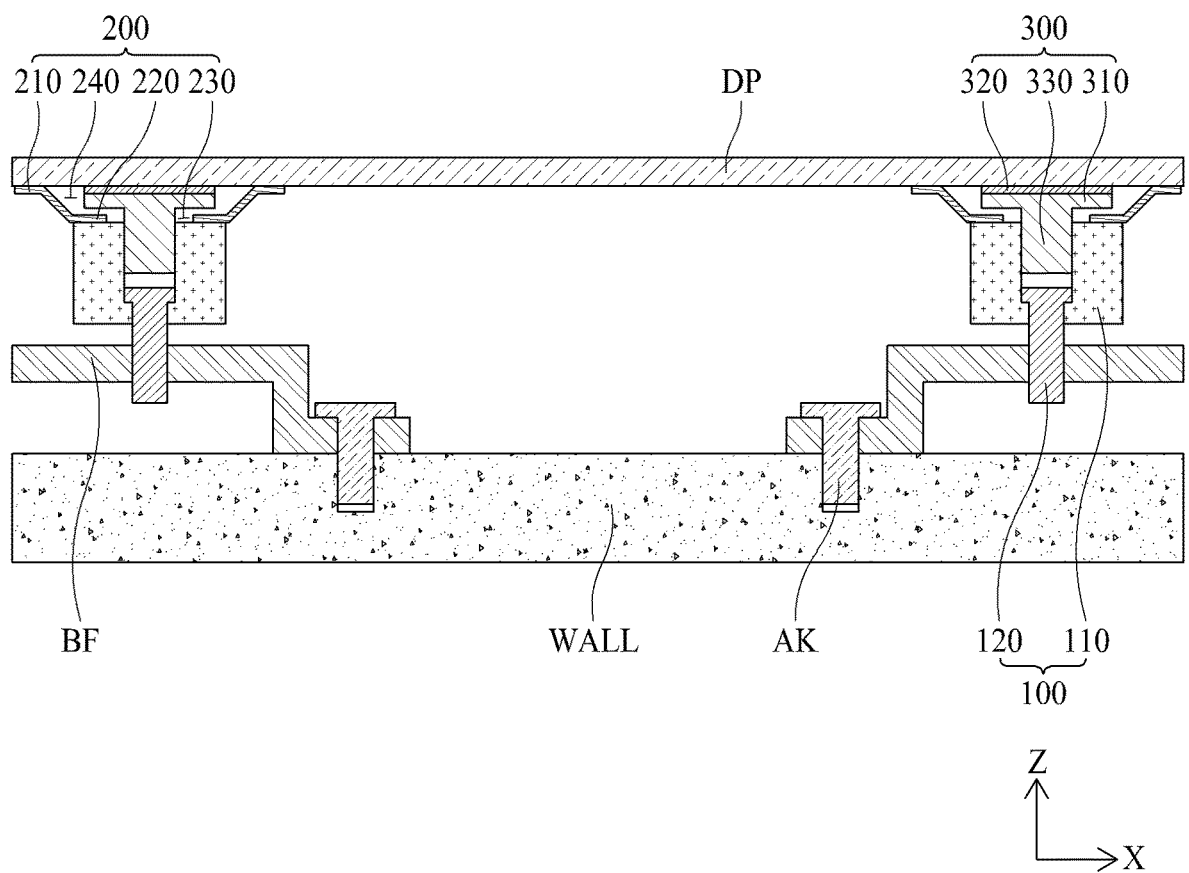
FIG. 7 is a cross sectional view illustrating a structure of a display apparatus including a tiling coupler according to the fourth embodiment of the present disclosure shown in FIG. 6.

Hereinafter, referring to FIGS. 6 and 7, the fourth embodiment of the present disclosure will be explained. FIG. 6 is a perspective view for illustrating a display apparatus including a tiling coupler according to the fourth embodiment of the present disclosure. FIG. 7 is a cross sectional view illustrating a structure of a display apparatus including a tiling coupler according to the fourth embodiment of the present disclosure shown in FIG. 6.

The display apparatus according to the fourth embodiment of the present disclosure can comprise a back frame BF, a display panel DP, a height adjustment element 100, a position adjustment element 200 and a position limiter 300. The back frame BF can be attached and fixed on the wall structure using a fixing member AK. Each one of display panel DP can be disposed as corresponding to each back frame BF.

The height adjustment element 100 can be a structure coupled or joined to the back frame BF and adjusted or controlled in height. It is preferable that the height adjustment element 100 can be made of a permanent magnet.

The height adjustment element 100 can include a cylindrical mount 110, a screw portion 120 and a base hole 130. The mount 110 and the screw portion 120 can be formed of a united body, or formed as separated objects and then combined. The screw portion 120 can have smaller diameter than the mount 110 and be extruded from the middle portion of the bottom surface of the mount 110. The screw portion 120 can be inserted into and coupled to a screw hole 121 provided at the back frame BF. In addition, according to the rotation of the screw portion 120, the height of the mount 110 can be adjusted.

The mount 110 can be disposed on the screw portion 120 and facing the position adjustment element 200. The mount 110 can include a mount surface 111 having a predetermined surface area.

At the center of the mount surface 111, a base hole 130 can be provided. The base hole 130 can be a center portion of the mount surface 111 recessed into the mount 110 with a predetermined depth. Therefore, the mount surface 111 can be the circumference surface of the upper surface of the mount 110.

Each of the position adjustment element 200 can be fixed on the rear surface of the display panel DP as corresponding to each of the height adjustment element 100. It is preferable that the position adjustment element 200 can be formed of a magnetic material which can be attached by the magnetic force of the permanent magnet.

For example, as the height adjustment element 100 can be a permanent magnet, the height adjustment element 100 can be made of a hard magnetic material such as Al—Ni—Co (Aluminum-Nickel-Cobalt) alloy. The position adjustment element 200 can be made of soft magnetic material which is magnetized and seated on the height adjustment element 100 when it is within the magnetic force range of the height adjustment element 100. When the position adjustment element 200 is out of the magnetic force range of the height adjustment element 100, the magnetization is removed.

The position adjustment element 200 can include an attaching surface 210, a position adjusting surface 220 and a position limiting hole 230. The attaching surface 210 can be a flat portion for attaching or fixing on the rear surface of the display panel DP. As shown in FIG. 6, the position adjustment element 200 can have a disc shape, and the attaching surface 210 can have a disc ring shape corresponding to the outermost circumference of the position adjustment element 200.

The position adjusting surface 220 can be a protruded portion from the attaching surface 210 toward the height adjustment element 100. For example, the position adjusting surface 220 can be a suppressed portion from the attaching surface 210 to have a disc shape surrounded by the attaching surface 210.

The position limiting hole 230 can be a through hole formed at the center of the position adjusting surface 220. It is preferable that the position limiting hole 230 can have a larger diameter than the base hole 130 formed at the height adjustment element 100.

As the attaching surface 210 and the position adjusting surface 220 of the position adjustment element 200 have a height difference, a space can be formed therebetween. This space is a space where the position limiter 300 can be arranged, and can be expressed as an adjusting chamber 240.

One of the main features in the fourth embodiment of the present disclosure can be the position limiter 300. The position limiter 300 can have a T-shaped structure in which main portion can be installed in the adjusting chamber 240 of the position adjustment element 200 and other portion can be extruded through the position limiting hole 230.

For example, the position limiter 300 can include a head 310, an extrusion 330 and a cushion 320. The head 310 can be a portion settling into the adjusting chamber 240. In detail, the head 310 can have a disc shape. It is preferable that the diameter of the head 310 can be larger than the diameter of the position limiting hole 230 so that the head 310 can be limitedly arranged inside the adjusting chamber 240.

The extrusion 330 can be a portion protruding toward the height adjustment element 100 from the center of the bottom surface of the head 310. It is preferable that the extrusion 330 can be inserted into the base hole 130 of the height adjustment element 100. For example, the extrusion 330 can have a cylindrical shape having a diameter little smaller than the diameter of the base hole 130 and a length little shorter than the depth of the base hole 130. The extrusion 330 can be inserted into the base hole 130 through the position limiting hole 230 starting from the head 310 located in the inner space of the adjusting chamber 240. The extrusion 330 can be corresponding to the protrusion portion 250 explained in the second embodiment shown in FIG. 4.

The upper surface of the head 310 can be a surface in close contact with the rear surface of the display panel DP. When moving on the XY plane to adjust the position of the display panel DP, a friction force can occur between the head 310 and the rear surface of the display panel DP. The rear surface of the display panel DP can be damaged by this friction force. To prevent this problem, the cushion 320 can be adhered to the upper surface of the head 310.

The sum of the height of the head 310 and the cushion 320 can be equal to or slightly lower than the height of the adjusting chamber 240. For example, the sum of the heights of the head 310 and the cushion 320 can be equal to or slightly smaller than the height difference between the attaching surface 210 and the position adjusting surface 220 of the position adjustment element 200.

The position limiting hole 230 can have a diameter smaller than the diameter of the head 310 and larger than the diameter of the extrusion 330.

The screw portion 120 of the height adjustment element 100 can be coupled to the screw hole 121 of the back frame BF. The position adjustment element 200 can include the position limiter 300, and can be fixed on the rear surface of the display panel DP. Here, the head 310 of the position limiter 300 can be located inside the adjusting chamber 240 of the position adjustment element 200, and the extrusion 330 can be protruded as penetrating the position limiting hole 230 of the position adjustment element 200.

When the display panel DP having the position limiter 300 and the position adjustment element 200 is combined with the back frame BF having the height adjustment element 100, the extrusion 330 of the position limiter 300 can be assembled while being inserted into the base hole 130 of the height adjustment element 100.

Since the position limiting hole 230 can have a larger diameter than the position limiter 300 and the base hole 130, the position adjustment element 200 can be positioned within the space between the position limiting hole 230 and the extrusion 330. In other words, while the position adjusting surface 220 of the position adjustment element 200 is seated on the mount surface 111 of the height adjustment element 100, the position can be adjusted on the XY plane formed by the mount surface 111. Here, the range of the position can be limited within the range of the distance between the position limiting hole 230 and the extrusion 330.

Figure 8:
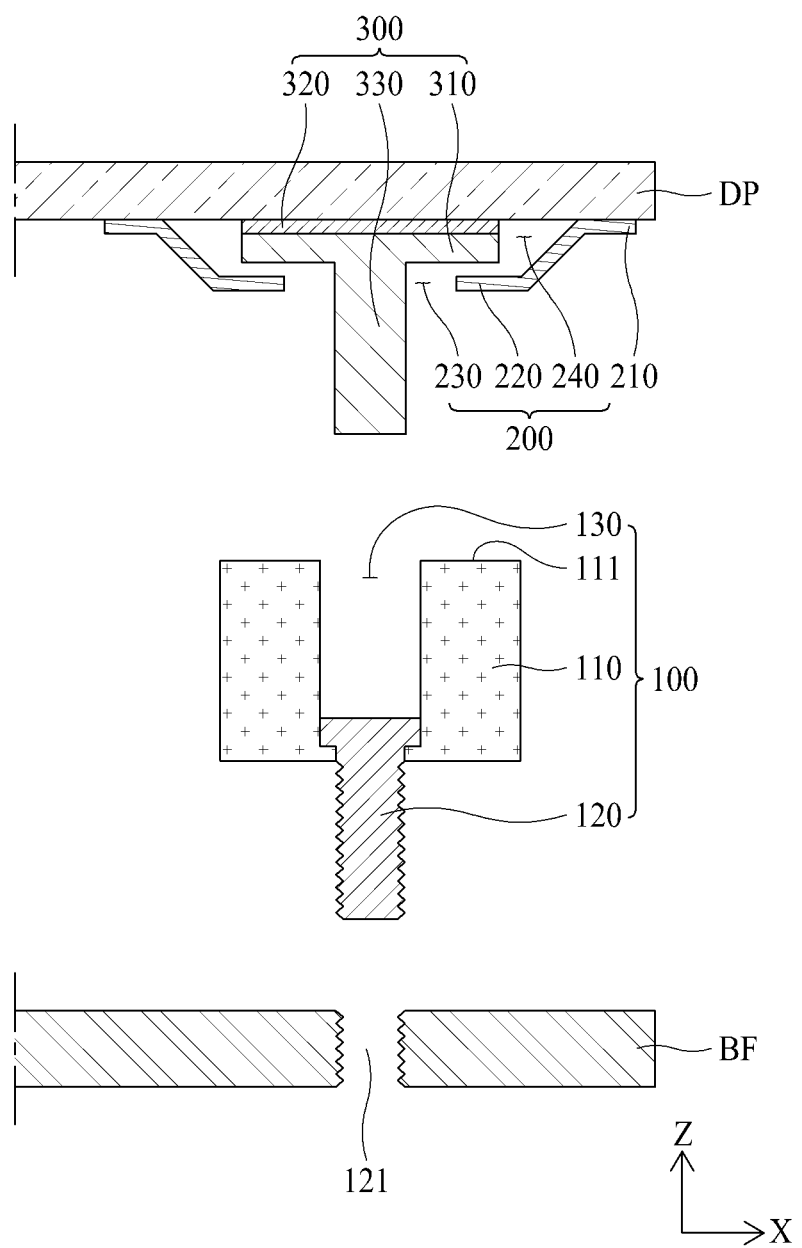
FIG. 8 is an enlarged cross-sectional view illustrating the configuration and the joining relationship of a tiling coupler in a display apparatus including the tiling coupler according to the fourth embodiment of the present disclosure shown in FIG. 6.

Hereinafter, referring to FIG. 8 it will be explained about the coupling structure for assembling the display panel according to the fourth embodiment of the present disclosure in a tiling manner FIG. 8 is an enlarged cross-sectional view illustrating the configuration and the joining relationship of a tiling coupler in a display apparatus including the tiling coupler according to the fourth embodiment of the present disclosure shown in FIG. 6.

The screw hole 121 can be formed at the back frame BF. The height adjustment element 100 can be joined into the screw hole 121.

The height adjustment element 100 can include a mount 110, a screw portion 120 and a base hole 130. It is preferable that the mount 110 can be made of a permanent magnet having a cylindrical shape. The screw portion 120 can be coupled to the lower part of the mount 110 and have the threads for engaging with the screw hole 121 formed at the back frame BF. Fastening the screw portion 120 into the screw hole 121, the height adjustment element 100 can be coupled to the back frame BF. As rotating the screw portion 120, according to the rotating direction, the height of the height adjustment element 100 can go up or down along the Z axis.

At the rear surface of the display panel DP, a position adjustment element 200 can be attached and/or fixed. The position adjustment element 200 can include an attaching surface 210, a position adjusting surface 220, a position limiting hole 230 and an adjusting chamber 240. One end portion of the position limiter 300 can be disposed in the adjusting chamber 240, and the other end portion of the position limiter 300 can penetrate the position limiting hole 230 and be extruded to the height adjustment element 100.

The position limiter 300 can include a head 310, an extrusion 330 and a cushion 320. As the head 310 is positioned inside the adjusting chamber 240 of the position adjustment element 200, the position limiter 300 can allow the position adjustment element 200 to move within a predetermined range with respect to the extrusion 330 on the XY plane. The extrusion 330 of the position limiter 300 can be inserted into the base hole 130 of the height adjustment element 100.

The force for mounting the display panel DP onto the back frame BF is the magnetic force of the height adjustment element 100. Therefore, even though the extrusion 330 is not firmly fastened to the base hole 130, there is no big problem in a state for the display panel DP to be seated on the back frame BF. However, in some cases, it can be required that the extrusion 330 and the base hole 130 are tightly coupled, so as to further prevent the display panel DP from being detached from the back frame BF by its own weight. For example, in the case that the sum of the heights of the head 310 and the cushion 320 is equal to the height of the adjusting chamber 240, the position adjusting surface 220 is compressed between the head 310 and the mount 110, it can effectively prevent the display panel DP from falling off the back frame BF. Accordingly, when a large-scaled display apparatus assembled by a tiling method is installed for a long time, it can be prevented from falling off the back frame BF or damaging the coupling structure due to the weight of the display panel DP.

In the display apparatus according to the fourth embodiment of the present disclosure, a plurality of back frame BF are disposed, and each of display panels DP is attached to each of the back frames BF, thereby a display apparatus having any surface area size can be easily implemented. Further, using the height adjustment element 100 provided at the back frame BF, the height of each of the display panels DP can be exactly adjusted, so that all tiled display panels DP can be combined to have a same surface height on the Z axis. In addition, by controlling the position of the display panel DP on the XY plane of the coupling surface between the height adjustment element 100 fixed to the back frame BF and the position adjustment element 200 fixed to the display panel DP, all tiled display panels DP can be in close contact with each other no gap therebetween.

Due to the position limiter 300, the position adjustment element 200 can be freely positioned under the condition that does not deviate from the range of the mount surface 111 on the XY plane. Therefore, the position adjustment element 200 can be effectively prevented from being detached from the height adjustment element 100 during the installation operation of the display apparatus.

When combining a plurality of display panels DP in a tiling manner, the position on XY plane and the height on the Z axis are respectively adjusted exactly. Therefore, the present disclosure can provide a large-sized display apparatus coupled without the gaps of the seams on the same plane.

As the coupling force tiling the plurality of the display panels DP uses the magnetic force, there is an advantage of easy assembly and disassembly. In addition, when a problem occurs in any one display panel after assembling the large-sized display apparatus by the tiling method, it is also easy to perform the operation of selectively disassembling the defected display panel and re-assembling with a new normal display panel.

Fifth Embodiment

Figure 9:
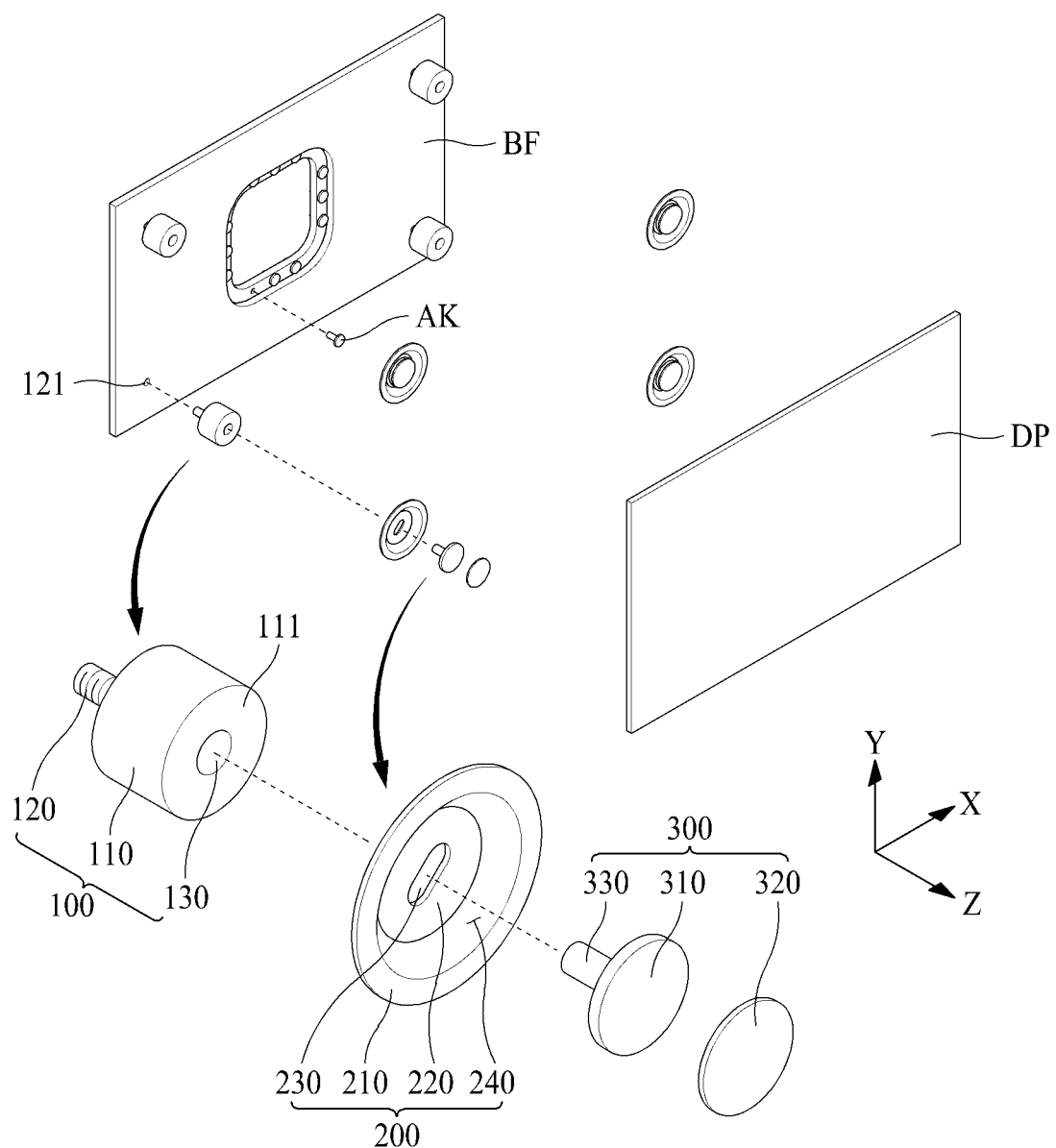
FIG. 9 is a perspective view for illustrating a display apparatus including a tiling coupler according to a fifth embodiment of the present disclosure.

Hereinafter, referring to FIG. 9, the fifth embodiment of the present disclosure will be explained. FIG. 9 is a perspective view for illustrating a display apparatus including a tiling coupler according to the fifth embodiment of the present disclosure.

The display apparatus according to the fifth embodiment of the present disclosure can comprise a back frame BF, a display panel DP, a height adjustment element 100, a position adjustment element 200 and a position limiter 300. Overall structure of the display apparatus having the tiling coupler according to the fifth embodiment can be very similar with that of the fourth embodiment. The main difference can be on the shape of the position limiting hole 230. Hereinafter, the differences appeared in the fifth embodiment will be mainly described. Here, the same drawings and reference numerals as in FIG. 6 that are not described refer to the fourth embodiment.

The height adjustment element 100 can include a cylindrical mount 110, a screw portion 120 and a base hole 130. The screw portion 120 can be inserted into and coupled to a screw hole 121 provided at the back frame BF. In addition, according to the rotation of the screw portion 120, the height of the mount 110 can be adjusted. The mount 110 can be disposed on the screw portion 120 and facing the position adjustment element 200. At the center of the mount surface 111, a base hole 130 can be provided. The base hole 130 can be a center portion of the mount surface 111 recessed into the mount 110 with a predetermined depth.

Each of the position adjustment element 200 can be fixed on the rear surface of the display panel DP as corresponding to each of the height adjustment element 100. It is preferable that the position adjustment element 200 can be formed of a magnetic material which can be attached by the magnetic force of the permanent magnet. The position adjustment element 200 can include an attaching surface 210, a position adjusting surface 220 and a position limiting hole 230. The attaching surface 210 can be a flat portion for attaching or fixing on the rear surface of the display panel DP. The position adjusting surface 220 can be a protruded portion from the attaching surface 210 toward the height adjustment element 100. As the attaching surface 210 and the position adjusting surface 220 of the position adjustment element 200 have a height difference, an adjusting chamber 240 can be formed therebetween.

The position limiter 300 can include a head 310, an extrusion 330 and a cushion 320. The head 310 can be a portion settling into the adjusting chamber 240. The extrusion 330 can be a portion protruding from the center of the bottom surface of the head 310. For example, the extrusion 330 can have a cylindrical shape having a diameter equal or little smaller than the diameter of the base hole 130 and a length little shorter than the depth of the base hole 130. The extrusion 330 can be inserted into the base hole 130 through the position limiting hole 230 starting from the head 310 located in the inner space of the adjusting chamber 240. The cushion 320 can be adhered to the upper surface of the head 310.

The position limiting hole 230 can have an oval shape. For example, the position limiting hole 230 can have a major (or long) axis and a minor (or short) axis. The minor axis of the position limiting hole 230 can have a length equal to or slightly larger than the diameter of the extrusion 330. The major axis of the position limiting hole 230 can have a length and direction that limits the range of the movement of the position adjusting surface 220. For one example, the major axis of the position limiting hole 230 can be arranged in a diagonal direction of 45 degree to 225 degree on the XY plane of the display panel DP according to the coordinate axes of FIG. 9. For another example, the major axis of the position limiting hole 230 can be arranged in a diagonal direction of 135 degree to 275 degree on the XY plane of the display panel DP.

It is preferable that the major axis of the position limiting hole 230 can be larger than the diameter of the head 310, but the minor axis of the position limiting hole 230 can be smaller than the diameter of the head 310. Even though the major axis of the position limiting hole 230 can be larger than the diameter of the head 310, the head 310 may not come out from the position limiting hole 230 due to that the minor axis of the position limiting hole 230 is smaller than the diameter of the head 310. For example, the major axis can be in range of 1.5 times to 2.5 times of the minor axis.

When the display panel DP having the position limiter 300 and the position adjustment element 200 is combined with the back frame BF having the height adjustment element 100, the extrusion 330 of the position limiter 300 can be assembled while being inserted into the base hole 130 of the height adjustment element 100.

Since the minor axis of the position limiting hole 230 can be equal to or slightly larger than the diameter of the position limiter 300 or base hole 130, the position adjustment element 200 can be coupled with the position limiter 300 tightly along the minor axis. Since the major axis of the position limiting hole 230 can be larger than the diameters of the position limiter 300 and base hole 130, the position of the extrusion 330 can be adjusted within a specific range along the major axis of the position limiting hole 230. In other words, while the position adjusting surface 220 of the position adjustment element 200 is seated on the mount surface 111 of the height adjustment element 100, the position can be adjusted on the XY plane formed by the mount surface 111 along the diagonal direction. Here, the range of the position can be limited within the range of the distance between the major axis of the position limiting hole 230 and the extrusion 330.

Hereinafter, referring to FIG. 10, the assembly process for the display panels having the tiling coupler according to the fifth embodiment of the present disclosure will be explained. FIGS. 10A and 10B are enlarged plan views illustrating an assembling process of 4 display panels including a tiling coupler according the fifth embodiment of the present disclosure.

Figure 10A:
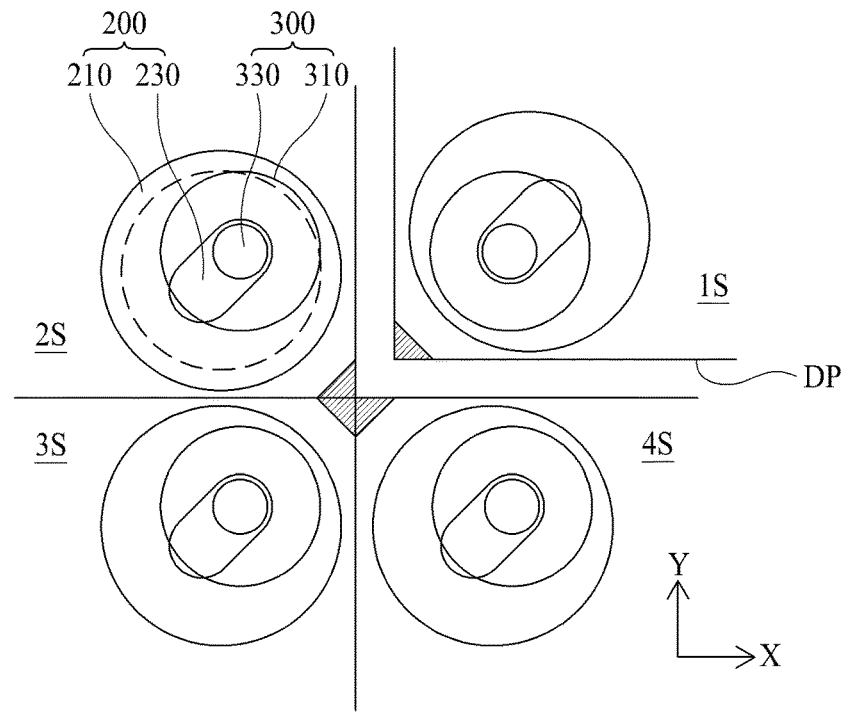
FIGS. 10A and 10B are enlarged plan views illustrating an assembling process of 4 display panels including a tiling coupler according the fifth embodiment of the present disclosure.
Figure 10B:
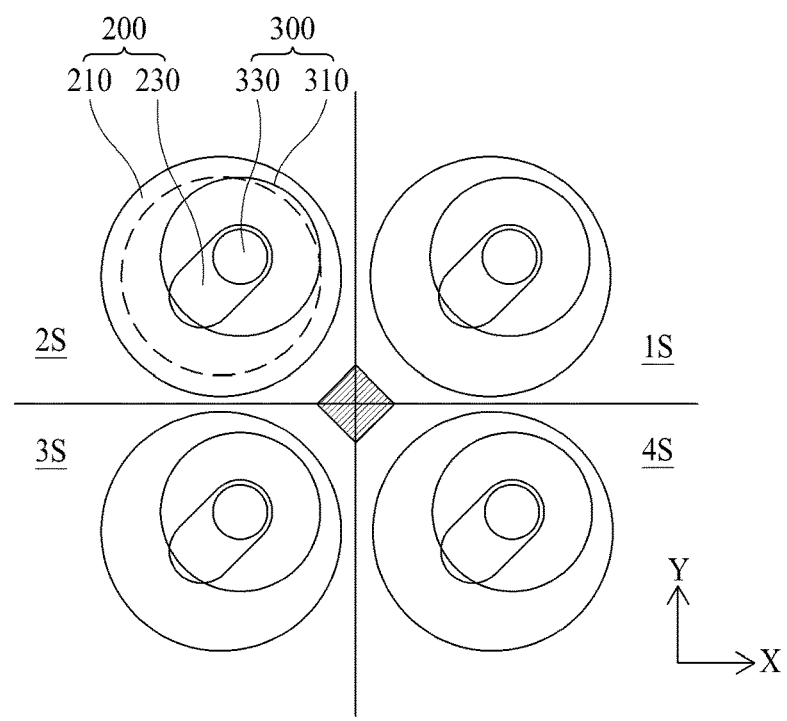

As shown in FIG. 10A, a fourth display panel can be assembled in the first quadrant 1S while three display panels DP can be already assembled in the second quadrant 2S, the third quadrant 3S and the fourth quadrant 4S, respectively. FIG. 10A shows a state in which the extrusion 330 is inserted into the base hole 130. On the XY plane, by combining in the direction biased in the 45 degree direction, assembling can be performed without any interference with the display panels DP that have been installed.

After that, the fourth display panel DP can be moved to 225 degree direction on the XY plane. As shown in FIG. 10B, the display panel DP for the first quadrant 1S can be completely assembled with the display panels DP of the second quadrant 2S, the third quadrant 3S and the fourth quadrant 4S.

Further, controlling the height of the height adjustment element 100, the heights of the display panels DP of the first quadrant 1S to the fourth quadrant 4S can be uniformly matched.

Sixth Embodiment

Figure 11:
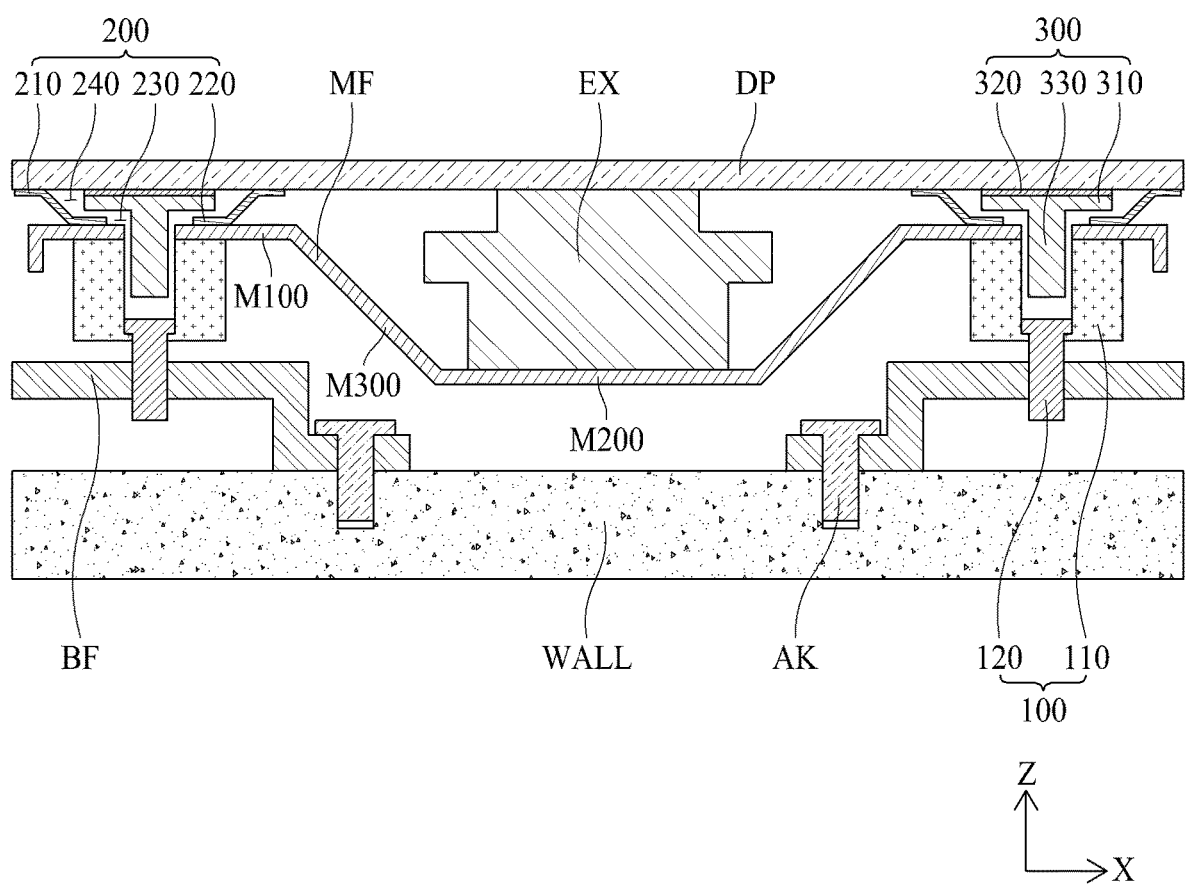
FIG. 11 is a cross-sectional view illustrating a display apparatus including a tiling coupler according to a sixth embodiment of the present disclosure.

Hereinafter, referring to FIG. 11, the sixth embodiment will be explained. FIG. 11 is a cross-sectional view illustrating a display apparatus including a tiling coupler according to the sixth embodiment of the present disclosure.

The sixth embodiment of the present disclosure will be described based on the cross-sectional view. The display apparatus according to the sixth embodiment can be very similar with that of the fourth embodiment. The difference can be that a middle frame MF can be further included between the height adjustment element 100 and the position adjustment element 200.

The middle frame MF can be an element for installing a devices additionally installed at the rear surface of the display panel DP. For example, as shown in FIG. 11, the middle frame MF can have a vessel shape for configuring to mount the sound generating device EX on the rear surface of the display panel DP.

In one example, the middle frame MF can include a base surface M100, a mounting surface M200 and a link surface M300. The base surface M100 can be disposed between the position adjustment element 200 and the height adjustment element 100. The mounting surface M200 can be a protruded portion from the base surface M100 toward the back frame BF, and can have a predetermined size suitable for mounting a various devices. The link surface M300 can be a portion connecting the base surface M100 and the mounting surface M200 that can have a gentle bevel (or slanted plane) shape.

It is preferable that the space between the mounting surface M200 and the rear surface of the display panel DP can have a volume suitable for the devices mounting therein. For example, when the sound generating device EX can be disposed as attaching to the rear surface of the display panel DP, the space between the mounting surface M200 and the rear surface of the display panel DP can be corresponding to the height of the sound generating device EX.

Seventh Embodiment

Figure 12:
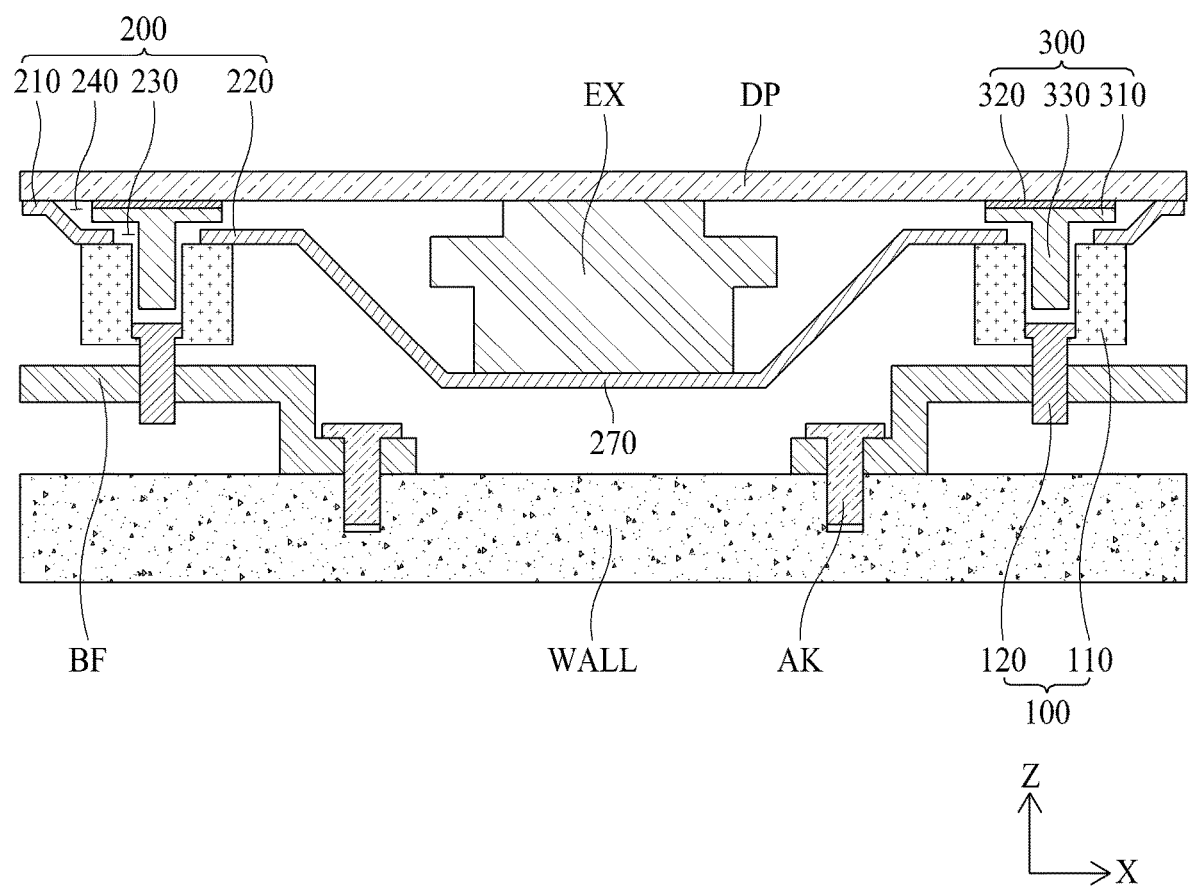
FIG. 12 is a cross-sectional view illustrating a display apparatus including a tiling coupler according to a seventh embodiment of the present disclosure.

Hereinafter, referring to FIG. 12, the seventh embodiment of the present disclosure will be explained. FIG. 12 is a cross-sectional view illustrating a display apparatus including a tiling coupler according to the seventh embodiment of the present disclosure.

The seventh embodiment of the present disclosure will be described based on the cross-sectional view. The display apparatus according to the seventh embodiment can be very similar with that of the fourth embodiment. The difference can be that the position adjustment element 200 can further include a space for installing the additional devices at the rear surface of the display panel DP.

For one example, the position adjustment element 200 can further include an installing surface 270 for mounting a device so as to have a similar structure as the position adjustment element 200 according to the third embodiment as shown in FIG. 5. In detail, the position adjustment element 200 of the display apparatus according to the seventh embodiment can include an attaching surface 210, a position adjusting surface 220, a position limiting hole 230 and an installing surface 270.

The attaching surface 210 can be a flat portion for attaching or fixing on the rear surface of the display panel DP. The position adjusting surface 220 can be a protruded portion from the attaching surface 210 toward the back frame BF. The position adjusting surface 220 can be the portion for coupling to the mount 110 of the height adjustment element 100. The position limiting hole 230 can be a through hole formed at the center of the position adjusting surface 220. The installing surface 270 can have a space formed by protruding to the back frame BF from the position adjusting surface 220. It is preferable that the installing surface 270 can have a vessel shape for mounting the devices installed at the rear surface of the display panel DP.

The position adjustment element 200 of the display apparatus according to the seventh embodiment can have a structure with the structure of the middle frame MF (as shown in FIG. 7) embedded therein. In one example, a large-sized display apparatus can be formed by arranging a plurality of display panels DP having a device such as the sound generating device EX in a matrix manner. In another example, a large-sized display apparatus can be formed by arranging a plurality of display panels in which some of the display panels DP having the sound generating device EX can be configured as shown in FIG. 12, and the other display panels DP without the sound generating device can be configured as shown in FIG. 7.

Eighth Embodiment

Figure 13:
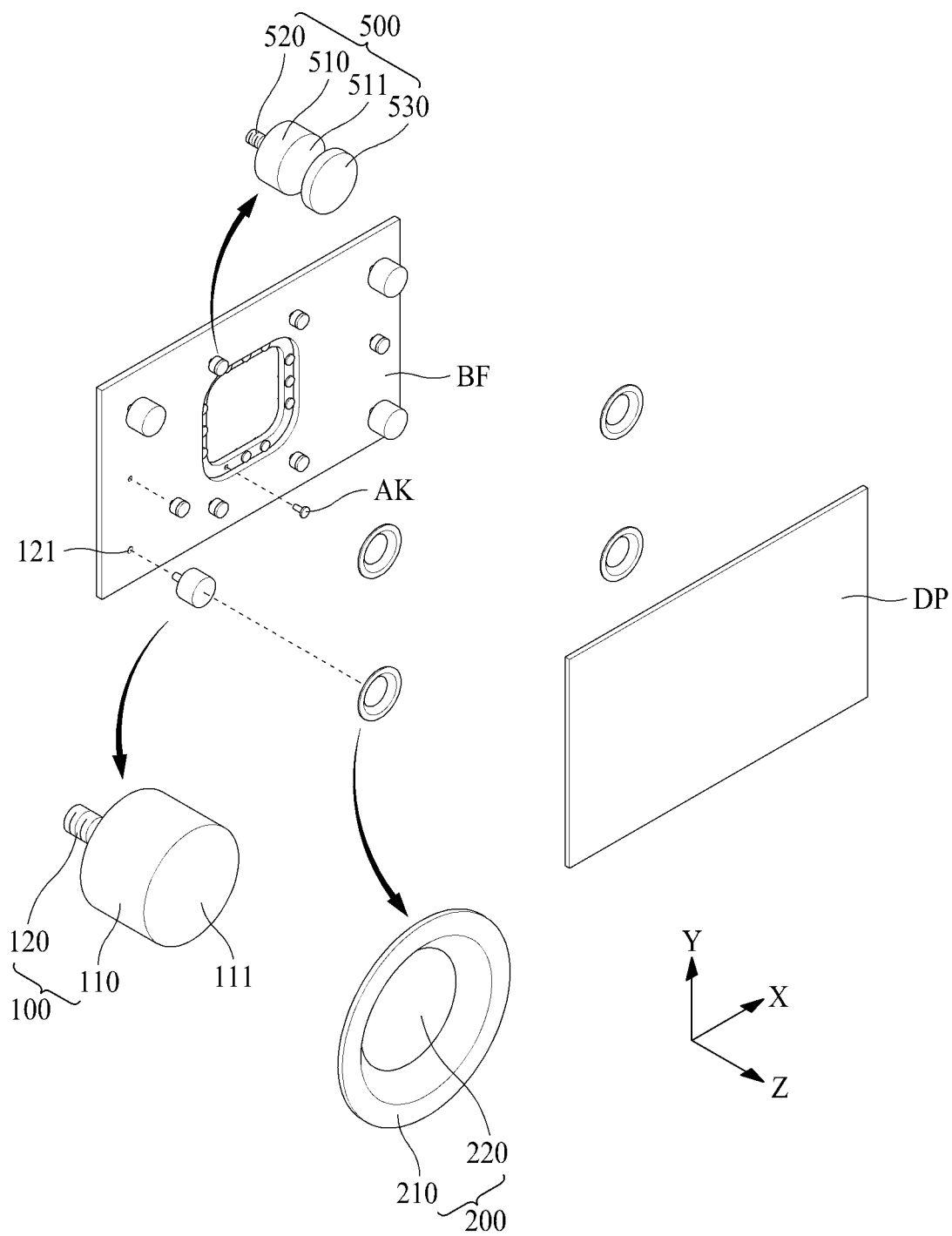
FIG. 13 is a perspective view illustrating a display apparatus including a tiling coupler according to an eighth embodiment of the present disclosure.

Hereinafter, referring to FIG. 13, the eighth embodiment of the present disclosure will be explained. FIG. 13 is a perspective view illustrating a display apparatus including a tiling coupler according to the eighth embodiment of the present disclosure.

Referring to FIG. 13, the display apparatus according to the eighth embodiment can further include a levelizer (or horizontal holding member). In the following description, a case where the levelizer is provided in the first embodiment will be explained. However, the main feature of the eighth embodiment can be applied to the display apparatuses having the tiling coupler according to the first to seventh embodiments explained in previous.

Referring to FIG. 13, the display apparatus according to the eighth embodiment of the present disclosure can comprise a back frame BF, a display panel DP, a height adjustment element 100, a position adjustment element 200 and a levelizer 500. As explained earlier, the back frame BF can be attached and/or fixed onto the wall structure WALL (see FIG. 1) using a fixing member AK. The display panel DP can be arranged as corresponding to the back frame BF. The display panel DP can include a liquid crystal display panel, an electroluminescent display panel, a quantum dot display panel and/or other flat display panel.

The height adjustment element 100 can be a structure mounted into the back frame BF and capable of adjusting its height. In particular, the height adjustment element 100 can be made of a permanent magnet material. The height adjustment element 100 can include a cylindrical mount 110 and a screw portion 120.

The screw portion 120 can be inserted into and coupled to a screw hole 121 provided at the back frame BF. The height of the mount 110 can be controlled by rotating the screw portion 120. In one example, the screw portion 120 can be a right-handed screw. As rotating to right-hand direction, the mount 110 can move to −Z direction, while as rotating to left-hand direction, the mount 110 can move to +Z direction.

Accordingly, due to the rotation of the screw portion 120, the height on the Z axis of the mount surface 111 of the mount 110 can be controlled.

It is preferable that each one of the position adjustment element 200 can be fixed on the rear surface of the display panel DP as corresponding to each one of the height adjustment element 100. Moreover, it is preferable that the position adjustment element 200 can be formed of a magnetic material that can be attached by the magnetic force of the permanent magnet.

The position adjustment element 200 can include an attaching surface 210 and a position adjusting surface 220. The attaching surface 210 can be a portion for attaching or fixing on the rear surface of the display panel DP. The position adjusting surface 220 can be a protruded portion from the attaching surface 210 toward the height adjustment element 100.

The position adjusting surface 220 can be a surface settled on the mount surface 111 by the magnetic force of the mount 110. The position adjusting surface 220 can be settled or mounted on the mount surface 111, and can be freely moved within the area of the mount surface 111 on the XY plane formed by the mount surface 111. As the position adjusting surface 220 moves on the mount surface 111, the position on the XY plane of the display panel DP fixed to the position adjustment element 200 can be controlled or adjusted.

The levelizer 500 can be a member for maintaining the horizontal state of the display panel DP by disposing between the display panel DP and the back frame BF. For example, each set of height adjustment element 100 and position adjustment element 200 can be disposed at each of four corners of the display panel DP. When the display panel DP has a relatively small size, i.e., less than 20 inches of diagonal length, the horizontal condition can be maintained using the height adjustment element 100 and position adjustment element 200 disposed at each corner of the display panel DP. Meanwhile, when the display panel has a relatively large area, i.e., more than 24 inches of diagonal length, any one side between two corners can be sagged. In the event of sag on each of the tiled panels, the entire display apparatus may be not maintained in uniformly flat condition, and the bumpy surface condition can be occurred. In this case, the quality of appearance can be deteriorated and a video image can be distorted.

In order to prevent this problem, the eighth embodiment provides the levelizer 500 disposed at each side of the display panel DP. The levelizer 500 can have a very similar structure of the height adjustment element 100.

For example, the levelizer 500 can be a structure mounted into the back frame BF and capable of adjusting its height. It is preferable that the levelizer 500 can be made of a permanent magnet material. The levelizer 500 can include a cylindrical level mount 510, a level mount surface 511, a level screw portion 520 and a level cushion 530.

The level screw portion 520 can be inserted into and coupled to a screw hole 121 provided at the back frame BF. The level screw portion 520 of the levelizer 500 can be same as the screw portion 120 of the height adjustment element 100.

The level mount 510 can be made of a permanent magnet. The level mount 510 can be disposed on the level screw portion 520. The level mount 510 of the levelizer 500 can be same as the mount 110 of the height adjustment element 100. The level mount surface 511 can be defined as the surface disposed at the opposite side of the level screw portion 520 in the level mount 510.

The level mount surface 511 can be a surface facing to the rear surface of the display panel DP. On the level mount surface 511, the level cushion 530 can be attached. As the level mount 510 can be made of a magnetic material, it can be made of hard material such as metal. Therefore, when the level mount surface 511 of the level mount 510 can be directly contact with the rear surface of the display panel DP, the display panel DP can be damaged by the friction force of the level mount 510 as the level mount 510 is rotating, or the rotation of the level mount 510 may be not performed correctly. To solve these problems, the level cushion 530 can be attached on the level mount surface 511. The level cushion 530 can directly contact with the rear surface of the display panel DP to reduce the friction force with the rear surface of the display panel DP and to protect the display panel DP.

By the rotation of the level screw portion 520, the height of the level mount 510 can be controlled. For example, rotating the levelizer 500 to right-handed direction, the level mount 510 can go down to −Z direction. Rotating the levelizer 500 to left-handed direction, the level mount 510 can go up to +Z direction. Therefore, the height of the level mount surface 511 of the level mount 510 can be controlled along the Z axis in accordance with the rotation of the level screw portion 520.

In the display apparatus according to the eighth embodiment of the present disclosure, a plurality of back frames BF are disposed and a display panel DP is attached to each of the back frames BF, thereby a display apparatus having any surface area size larger than the display panel DP can be implemented by combining the display panels DP in a tiling manner. In addition, as the height of each display panel DP can be finely controlled using the height adjustment element 100 provided in the back frame BF, all tiled display panels DP can be combined as having the same surface height on the Z axis. Furthermore, by controlling the position on the XY plane of the position adjustment element 200 fixed to the display panel DP on the height adjustment element 100 fixed to the back frame BF, the tiled display panels DP can be in close contact with each other having no gap therebetween.

When combining a plurality of display panels DP in tiling method, the position on the XY plane and the height on the Z axis can be respectively controlled or adjusted. Therefore, it is possible to provide a large-sized display apparatus that is combined without gaps of seams on the same plane. In addition, further comprising the levelizer 500 at the middle position of each side of the display panel DP, it can prevent the problem of not being levelled by the sag of the middle part of the display panel DP.

Figure 14:
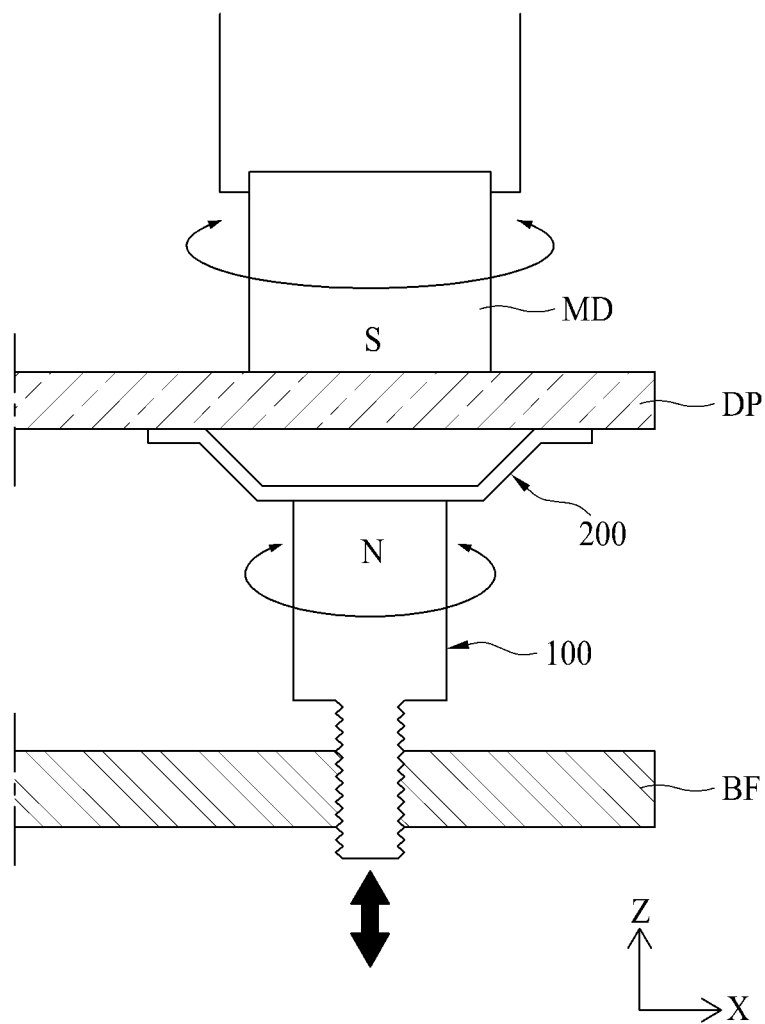
FIG. 14 is a cross sectional view illustrating a mechanism for adjusting the height and position in the tiling coupler according to the present disclosure.

Hereinafter, referring to FIG. 14, an example of height adjustment in a display apparatus having a tiling coupler according to the present disclosure will be explained. FIG. 14 is a cross sectional view illustrating a mechanism for adjusting the height and position in the tiling coupler according to the present disclosure. The features explained referring to FIG. 14 can be applied to all embodiments previously described.

By rotating the height adjustment element 100 in a state of tiling the large-sized display apparatus according to the present disclosure, the height of the surface of display panel can be adjusted with a height of the neighboring display panel. After assembling the plurality of the display panel, in order to adjust the height of the display panel disposed at the center portion in the large-sized display apparatus, the height of the display panel can be controlled using the height adjustment element 100 having the permanent magnetic properties.

As shown in FIG. 14, as the height adjustment element 100 can be formed of the permanent magnet, the upper surface of the mount 110 can have any one pole of N pole and S pole. Using a magnetic driver tool MD made of permanent magnet, the height adjustment element 100 can be rotated over the upper surface of the display panel DP. For example, when the upper surface of the mount 110 of the height adjustment element 100 has been magnetized with N pole, the S pole of the magnetic driver tool MD can be contacted to the upper surface of the display panel DP, then the height adjustment element 100 and the magnetic driver tool MD can be attached by the magnetic attraction force. Under this condition, rotating the magnetic driver tool MD to left-handed direction or to right-handed direction, the height of the height adjustment element 100 can be controlled on the Z axis.

Further, the levelizer 500 described in the eighth embodiment also has the same structure as the height adjustment element 100, so that the height of the levelizer 500 can be controlled in the same manner By controlling the heights of the height adjustment element 100 and/or levelizer 500, the surface height of the assembled large-sized display apparatus can be adjusted to have a constant level. Further, the display apparatus according to the present disclosure can be easily and finely re-adjusted at any time when any level difference is occurred after completing the assembly.

Figure 15:
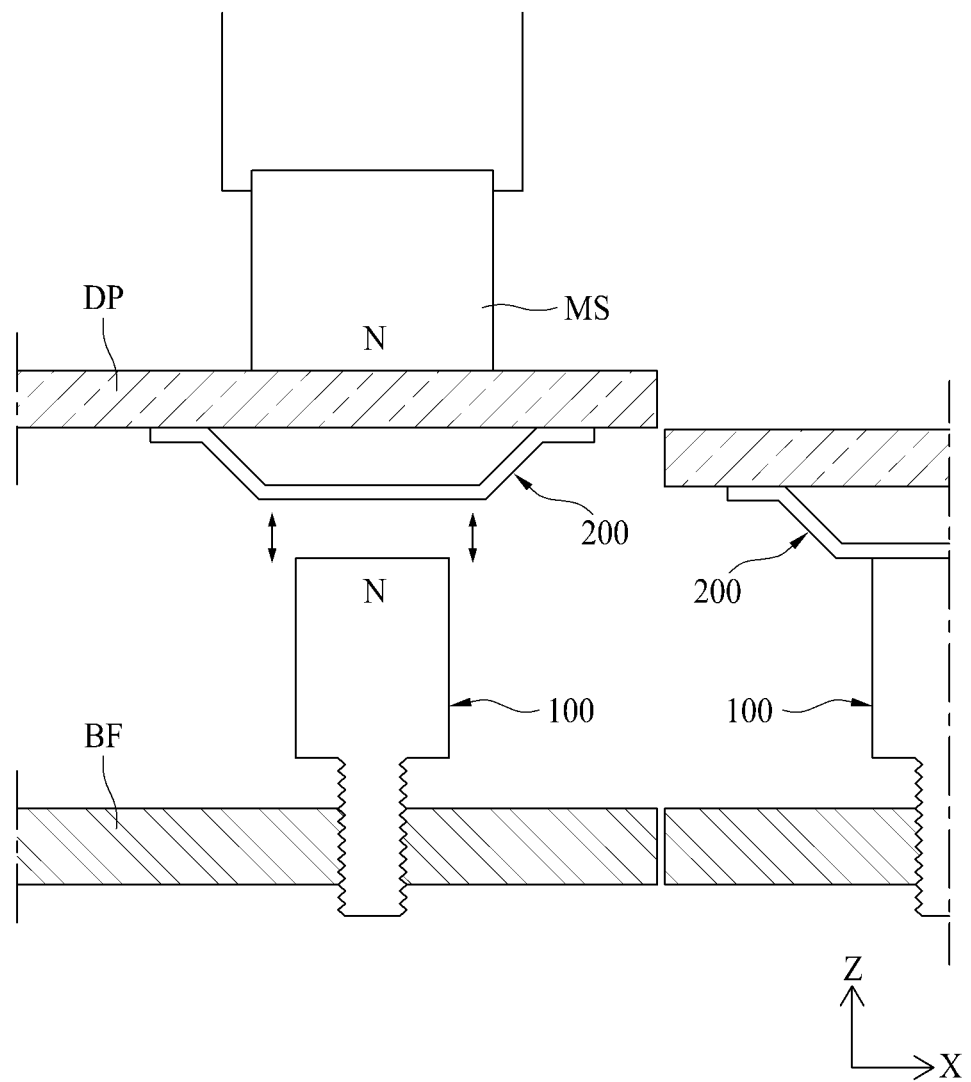
FIG. 15 is a cross sectional view illustrating a process of disassembling a display panel from the back frame using the magnetic force in a display apparatus including the tiling coupler according to the present disclosure.

Hereinafter, referring to FIG. 15, an example of disassembling a specific display panel after assembling a large-sized display apparatus by the tiling method according to the present disclosure will be explained. FIG. 15 is a cross sectional view illustrating a process of disassembling a display panel from the back frame using the magnetic force in a display apparatus including the tiling coupler according to the present disclosure. The features of the present disclosure described referring to FIG. 15 can be applied to all embodiments previously explained.

The most inconvenient and/or harder process in a large display apparatus formed by assembling a plurality of small display panel by tiling method is to separate one small display panel having a problem to repair after assembly. Under completely assembled state in which the small display panels are closely assembled so as not to recognize the seam portions, in order to separate one specific display panel, it is necessary to accurately lift off the display panel along the exact vertical direction, but this operation is very difficult.

The present disclosure has a feature in that a unit display panel constituting a large-sized display apparatus can be removed from the assembled large display apparatus using the magnetic force. For example, the large-sized display apparatus according to the present disclosure can have been assembled in a state as shown in FIG. 15. FIG. 15 shows one portion of assembled display apparatus according to the first embodiment.

As the height adjustment element 100 can be made of a permanent magnet, the upper surface of the mount 110 can have N pole or S pole. By contacting a magnetic separator MS made of a permanent magnet on the upper surface of the display panel DP, the display panel DP assembled with the position adjustment element 200 can be separated from the back frame BF assembled with the height adjustment element 100.

For one example, when the upper surface of the mount 110 of the height adjustment element 100 has been magnetized with N pole, by putting the N pole of the magnetic separator MS on the upper surface of the display panel DP, a magnetic repulsion force can be formed between the height adjustment element 100 and the magnetic separator MS. Here, it is preferable that the magnetic separator MS can have stronger magnetic force than the height adjustment element 100. As the position adjustment element 200 is coupled to the height adjustment element 100 by the magnetic force, the position adjustment element 200 has been magnetized with N pole like the height adjustment element 100. Under this condition, when the magnetic separator MS has a magnetic force smaller than the height adjustment element 100, the magnetic separator MS can be pushed out by the magnetic force of the height adjustment element 100, and the display panel DP may not be separated.

However, when the magnetic separator MS has a magnetic force larger than the height adjustment element 100, the position adjustment element 200 can be attached to the magnetic separator MS having the relatively larger magnetic force. Accordingly, the position adjustment element 200 can be magnetized with N pole like the magnetic separator MS. Then, the position adjustment element 200 can be easily separated from the height adjustment element 100 by the magnetic repulsive force between N pole and N pole.

The magnetic driver tool MD explained in FIG. 14 and the magnetic separator MS explained in FIG. 15 are described as the different element. However, one magnetic tool can be configured to be used as a driver tool for rotating the height adjustment element 100 and as a separator for disassembling the display panel DP. In this case, it is preferable that the magnetic tool can be made of a permanent magnet having a magnetic force larger than the height adjustment element 100. In addition, it is preferable that the magnetic tool has a structure that can be rotated so that N pole and S pole can be selected, or has a structure that can be separated and re-mounted after turning over.

Figure 16:
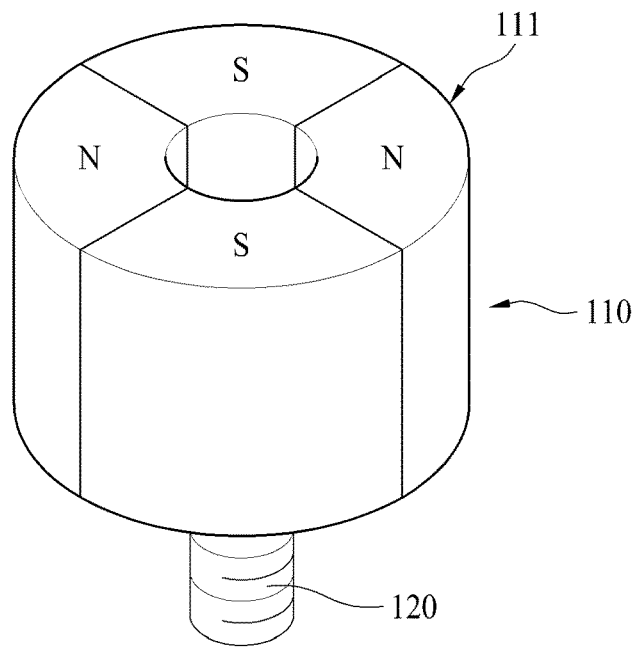
FIG. 16 is a diagram illustrating one example of a height adjustment element in a tiling coupler according to the present disclosure.

Hereinafter, another example for the height adjustment element according to the present disclosure will be explained. FIG. 16 is a diagram illustrating one example of a height adjustment element in a tiling coupler according to the present disclosure.

Referring to FIG. 16, the height adjustment element 100 according one example of the present disclosure can include a cylindrical mount 110 and a screw portion 120. The mount 110 and the screw portion 120 can be formed of a united body, or formed as separated objects and then combined. For example, the screw portion 120 can have a smaller diameter than the mount 110 and can have a structure protruding from the center of the lower surface of the mount 110. In another example, after forming the screw portion 120 and the mount 110 in a long cylindrical shape with a neodymium magnet, a thread is formed in a lower portion to define the screw portion 120, and the upper portion can be defined as the mount 110.

The mount 110 can be disposed on the screw portion 120 and facing with the position adjustment element 200. The upper surface of the mount 110 can be defined as a flat mount surface 111 having a predetermined area.

In one example, the mount 110 can have a 4 pole structure. For example, the cylindrical mount 110 can be divided into four sections in a plane view, and each of the 4 fan-shaped pillar portions (or 4 fan-shaped columns) can have been magnetized alternately. Here, the mount surface 111 can include a first quadrant magnetized with N pole, a second quadrant magnetized with S pole, a third quadrant magnetized with N pole and a four quadrant magnetized with S pole, in a counter clockwise direction. In this case, the screw portion 120 can be made of a demagnetized material.

In the case in which the height adjustment element 100 can have a structure as shown in FIG. 16, it is preferable that the magnetic driver tool MD explained in FIG. 14 and the magnetic separator MS explained in FIG. 15 can have the 4 poles structure also. In addition, it is preferable that the magnetic heads of the magnetic driver tool MD and the magnetic separator MS can be configured to be rotatable to set the magnetic head for selectively having the same pole or the different pole with the height adjustment element 100.

Figure 17:
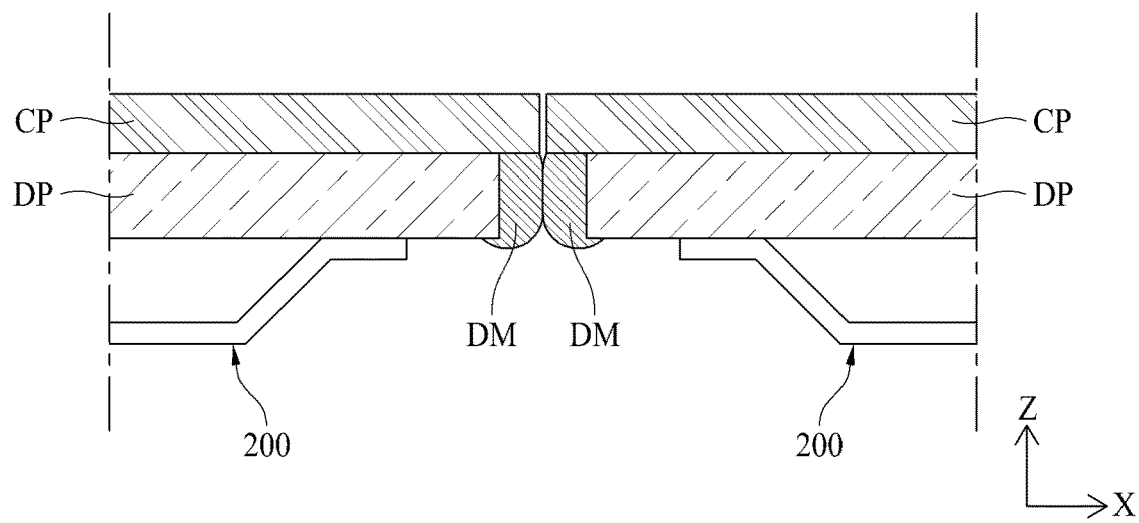
FIG. 17 is an enlarged cross sectional view illustrating a structure of joining portion in a display apparatus including a tiling coupler according to the present disclosure.

Hereinafter, referring to FIG. 17, the structure in which the tiled display panels are prevented from being damaged by the friction force between them will be explained. FIG. 17 is an enlarged cross sectional view illustrating a structure of joining portion in a display apparatus including a tiling coupler according to the present disclosure.

In the above explanations, the display panel DP has been described with a simple rectangular structure. However, disposing a plurality of display panels DP in close contact with each other and thus constructing a large display apparatus, there can be an increased possibility of damage due to impact and friction between the sides of the display panels DP abutting each other. In order to prevent this problem, the detailed structure of the display panel DP can be as shown in FIG. 17. However, this is one example for reducing the damages from the friction and impact between abutting sides of the display panels, so it is not limited thereto.

Referring to FIG. 17, the display apparatus according to the present disclosure can comprise a display panel DP, a cover plate CP and a damper DM. The cover plated CP can be attached on the upper surface of the display panel DP. The cover plate CP can have the same size as the display panel DP. Otherwise, the cover plate CP can have slightly larger area than the display panel DP. Here, the case where the cover plate CP has a slightly larger area than the display panel DP will be explained.

The damper DM can be disposed at the circumferences of the display panel DP. It is preferable that the damper DM can have a minimum thickness. For example, when the cover plate CP is larger than the display panel DP, the damper DM can be coated as filling within the space between the cover plate CP and the display panel DP and surrounding the circumferences of the display panel DP, and slightly protruded from the edge sides of the display panel DP.

With this condition, as tiling two display panels DP, it is preferable that the damper DM can be suppressed a little and then the display panels DP are assembled as the cover plates CP can be in closed with each other. Here, the protruded amount of the cover plate CP out of the display panel DP, i.e., the size difference between the cover plate CP and the display panel DP, can be minimized. When the size difference is too large, the seam can be easily recognized so that the display quality can be degraded. When the size difference is too small, the impact can be occurred as assembling in tiling manner or the friction can be occurred as adjusting the height of the display panel DP, so that the display panels DP can be damaged.

Figure 18:
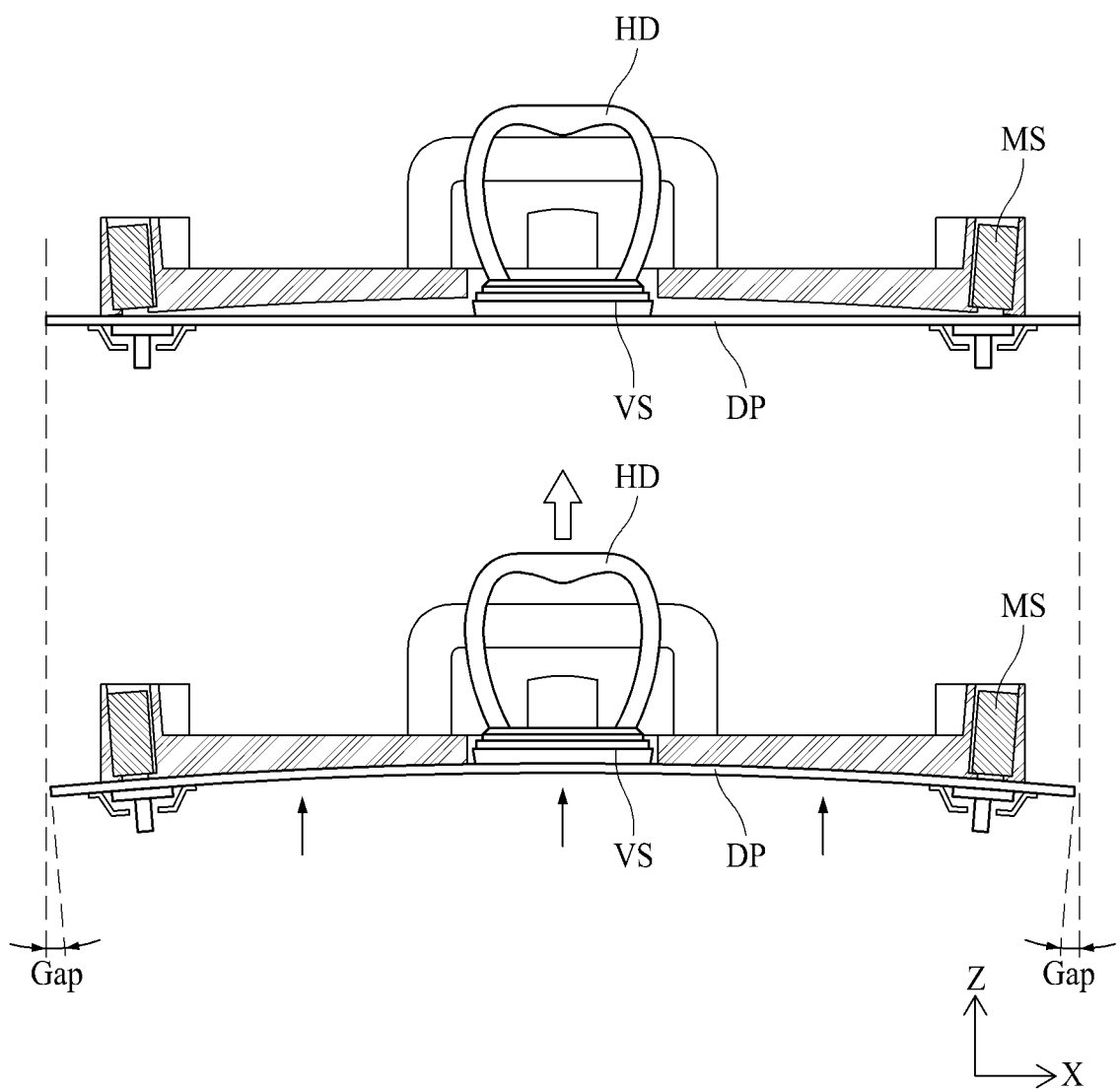
FIG. 18 is a cross sectional view illustrating a process of disassembling a unit display panel (or device) from a display apparatus assembled in a large scale by a tiling coupler according to the present disclosure.

Hereinafter, referring to FIG. 18, a process of separating one unit display panel DP from a large-sized display apparatus assembled by a tiling method will be explained. FIG. 18 is a cross sectional view illustrating a process of disassembling a unit display panel (or device) from a display apparatus assembled in a large scale by a tiling coupler according to the present disclosure. In the state in which the display panels DP are assembled in a structure as shown in FIG. 17, when any one display panel DP is disassembled, a separating device can be set on the surface of the display panel DP.

The separation device can include a vacuum absorber VS, a handle HD and a magnetic separator MS. The vacuum absorber VS can be set on the middle portion of the display panel DP. The handle HD can be integrally formed with the vacuum absorber VS. The magnetic separator MS can be set on the position corresponding to the position adjustment element 200.

After setting the vacuum absorber VS on the middle portion of the display panel DP, and setting the magnetic separator MS on the position adjustment element 200, the vacuum absorber VS can be attached to the display panel DP using the handle HD. Here, the magnetic separator MS can be contacted the surface of the display panel DP, so that the position adjustment element 200 can be separated from the height adjustment element 100 as explained in FIG. 15.

Pulling the handle HD up to the +Z axis, the middle portion of the display panel DP can be curved up (or soar up) but the circumference portions can be curved down by the friction force with the dampers DM of the neighboring display panels DP. Thus, as the display panel DP is bended, a gap is formed at the edge portions. At this time, as the separation force by the magnetic force of the magnetic separator MS is added to the external force of the operator acting on the handle HD, the display panel DP can be easily disengaged or disassembled.

After separating the unit display panel having any error from the assembled large display apparatus, the new normal unit display panel can be reassembled or re-engaged in the reverse order. When reassembling, by pressing the middle portion of the display panel DP, and bending the display panel DP in a direction opposite to when disassembling, a gap is formed at the edge portion of the display panel DP, so that it can be easily inserted and mounted. After inserting the new normal display panel DP, the display panel DP can be exactly assembled in the large display apparatus by the magnetic force between the height adjustment element 100 and the position adjustment element 200.

Features, structures, effects and so on described in the above described examples of the present disclosure are included in at least one example of the present disclosure, and are not necessarily limited to only one example. Furthermore, features, structures, effects and so on exemplified in at least one example of the present disclosure can be implemented by combining or modifying other examples by a person having ordinary skilled in this field. Therefore, contents related to such combinations and modifications should be interpreted as being included in the scope of the present application.

It will be apparent to those skilled in the art that various modifications and variations can be made in the present disclosure without departing from the spirit or scope of the disclosures. Thus, it is intended that the present disclosure covers the modifications and variations of this disclosure provided they come within the scope of the appended claims and their equivalents. These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

What is claimed is:

1. A display apparatus comprising:
   a display panel;
   a back frame configured to attach to a wall structure by a fixing element;
   a height adjustment element joined to the back frame, and including a permanent magnet, a height of the height adjustment element being adjustable;
   a position adjustment element fixed to a rear surface of the display panel, including a magnetic material mounted by a magnetic force of the height adjustment element, and configured to adjust a position to which the position adjustment element is attached, on a plane defined by the height adjustment element; and
   a middle frame disposed between the height adjustment element and the position adjustment element, and attached at the rear surface of the display panel,
   wherein the middle frame has a concave shape configured to be protruded toward the back frame to ensure a space for mounting a device.

2. The display apparatus according to claim 1, wherein the height adjustment element includes:
   a screw portion joined to the back frame and configured to adjust the height of the height adjustment element; and
   a mount disposed on the screw portion and facing the position adjustment element.

3. The display apparatus according to claim 2, wherein the screw portion of the height adjustment element is joined into a screw hole of the back frame, and the height of the height adjustment element is adjusted by a rotating operation.

4. The display apparatus according to claim 2, wherein the position adjustment element includes:
   an attaching surface fixed to the display panel; and
   a position adjusting surface protruded from the attaching surface toward the height adjustment element, and
   wherein the position adjusting surface is settled on a mount surface defined at an upper surface of the mount by the magnetic force of the height adjustment element, and is configured to change the position of the position adjusting surface on a plane of the mount surface by an external force.

5. The display apparatus according to claim 1, wherein the height adjustment element further includes:
   a base hole facing the position adjustment element, and
   wherein the position adjustment element further includes:
   a position limiter inserted into the base hole of the height adjustment element, and configured to restrict a position range of the display panel.

6. The display apparatus according to claim 5, wherein an inner diameter of the base hole is larger than an outer diameter of the position limiter, and
   wherein the position limiter is controlled within a range of difference between the inner diameter and the outer diameter on the plane defined by the height adjustment element by an external force, after inserting into the base hole.

7. The display apparatus according to claim 5, wherein the position adjustment element further includes:
   an attaching surface fixed to the display panel;
   a position adjusting surface protruded from the attaching surface toward the height adjustment element;
   a position limiting hole formed at the position adjusting surface;
   an adjusting chamber formed between the attaching surface and the position adjusting surface; and
   a position limiter having:
   a head mounted in the adjusting chamber,
   an extrusion protruded from a center portion of a bottom surface of the head, and
   a cushion attached on an upper surface of the head, wherein the position limiting hole has a diameter that is smaller than a diameter of the head and larger than a diameter of the extrusion, and wherein the extrusion is configured to penetrate the position limiting hole and to be inserted into the base hole.

8. The display apparatus according to claim 7, wherein the position limiting hole includes an oval shape having a major axis and a minor axis, wherein the minor axis has a length that is same as a diameter of the extrusion, and wherein the major axis has a length larger than the diameter of the extrusion, and is disposed in a diagonal direction on a surface of the display panel.

9. The display apparatus according to claim 1, wherein a plurality of the height adjustment elements are disposed at the back frame, and a plurality of the position adjustment elements are provided on the display panel, and wherein each one of the plurality of position adjustment elements is disposed at the display panel as corresponding to each one of the plurality of height adjustment elements.

10. The display apparatus according to claim 1, further comprising:

a levelizer disposed at the back frame as being spaced apart from the height adjustment element.

11. The display apparatus according to claim 10, wherein one of a plurality of the height adjustment elements is disposed at each corner of the back frame, and wherein one of a plurality of the levelizers is disposed at a middle portion of each side of the back frame.

12. The display apparatus according to claim 1, wherein the height adjustment element has a cylindrical body having a neodymium magnetic material.

13. The display apparatus according to claim 1, wherein the height adjustment element is divided into 4 fan-shaped columns which are magnetized with N pole and S pole alternately.

14. A display apparatus comprising:

a display panel;

a back frame configured to attach on a wall structure by a fixing element;

a height adjustment element joined to the back frame and including a permanent magnet, a height of the height adjustment element being adjustable;

a position adjustment element including:

an attaching surface fixed to a rear surface of the display panel, a position adjusting surface protruding from the attaching surface toward the height adjustment element, a position limiting hole formed at the position adjusting surface, and an adjusting chamber provided between the attaching surface and the position adjusting surface; and a position limiter including:

a head settled inside of the adjusting chamber, an extrusion protruded from a middle portion of a bottom surface of the head, and a cushion attached on an upper surface of the head, wherein the position limiting hole has a diameter that is smaller than a diameter of the head and larger than a diameter of the extrusion, and wherein the extrusion is configured to pass through the adjusting chamber and to be inserted into the position limiting hole.

15. The display apparatus according to claim 14, wherein the position adjustment element includes a magnetic material for being settled by a magnetic force of the height adjustment element, and for controlling the position of the position adjusting surface on a plane defined by the height adjustment element.

16. The display apparatus according to claim 14, wherein the position limiting hole includes an oval shape having a major axis and a minor axis, wherein the minor axis has a length that is same as a diameter of the extrusion, and wherein the major axis has a length larger than the diameter of the extrusion, and is disposed in a diagonal direction on a surface of the display panel.

17. The display apparatus according to claim 14, wherein the height adjustment element includes:

a screw portion joined to the back frame configured to adjust the height; and a mount disposed on the screw portion and facing the position adjustment element.

18. The display apparatus according to claim 14, further comprising:

a levelizer disposed at the back frame as being spaced apart from the height adjustment element.

* * * * *